US008069979B2

(12) United States Patent
Newman et al.

(10) Patent No.: US 8,069,979 B2
(45) Date of Patent: *Dec. 6, 2011

(54) CONTACT LENS PACKAGE AND STORAGE CASE, HOLDER, AND SYSTEM AND METHOD OF MAKING AND USING

(75) Inventors: Stephen D. Newman, Bayshore Park (SG); Jonathan C. Coon, Holladay, UT (US); Kevin K. McCallum, Draper, UT (US); Bruce V. Christy, III, Draper, UT (US); Desmond C. S. Cheon, Singapore (SG); Joanne M. Oliver, San Francisco, CA (US); Mark A. Zeh, Mountain View, CA (US); Lynda Deakin, San Francisco, CA (US); Rachel Wong, Chandler, AZ (US); Jonah L. Houston, San Francisco, CA (US); Anthony J. Rossetti, San Jose, CA (US); John Ravitch, Oakland, CA (US)

(73) Assignee: 1-800 Contacts, Inc., Draper, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/902,103

(22) Filed: Oct. 11, 2010

(65) Prior Publication Data
US 2011/0031137 A1 Feb. 10, 2011

Related U.S. Application Data

(63) Continuation of application No. 10/527,383, filed as application No. PCT/US03/028991 on Sep. 15, 2003, now Pat. No. 7,832,551.

(60) Provisional application No. 60/410,773, filed on Sep. 13, 2002.

(51) Int. Cl.
 A45C 11/04 (2006.01)
 G04B 47/00 (2006.01)
 B65D 85/00 (2006.01)
(52) U.S. Cl. .......... 206/5.1; 206/459.1; 134/901
(58) Field of Classification Search .......... 206/5.1, 206/570, 581, 459.1, 205, 459, 5; 134/901; 294/1.2
See application file for complete search history.

(56) References Cited

U.S. PATENT DOCUMENTS

| D190,344 S | 5/1961 | Phipps |
| 3,037,616 A | 6/1962 | Phipps, III |
| D208,166 S | 7/1967 | Hueber et al. |
| D239,413 S | 3/1976 | Hoogesteger |
| 4,823,944 A | 4/1989 | Ryder |

(Continued)

FOREIGN PATENT DOCUMENTS
EP 0223581 5/1987
(Continued)

*Primary Examiner* — Steven A. Reynolds
(74) *Attorney, Agent, or Firm* — Holland & Hart LLP

(57) ABSTRACT

A reusable holder for contact lens cases includes a base, at least one receptacle formed in the base configured to receive a contact lens case, and a time keeping device formed in the base. The time keeping device may include an indicator for the at least one receptacle that indicates a period of time that has lapsed since the contact lens case currently in the at least one receptacle was placed therein to denote a need to discard the contact lens case and a contact lens associated with the contact lens case.

9 Claims, 15 Drawing Sheets

U.S. PATENT DOCUMENTS

| | | | |
|---|---|---|---|
| 4,863,698 A * | 9/1989 | Ryder et al. | 422/116 |
| 4,909,382 A * | 3/1990 | Cuppari | 206/5.1 |
| D317,527 S | 6/1991 | Bonelli | |
| 5,129,999 A * | 7/1992 | Holland et al. | 205/701 |
| 5,130,011 A | 7/1992 | Sage, Jr. | |
| 5,131,532 A | 7/1992 | Ives | |
| 5,156,175 A | 10/1992 | Jones | |
| 5,224,593 A | 7/1993 | Bennett | |
| 5,280,834 A * | 1/1994 | Berkley | 206/5.1 |
| 5,433,314 A | 7/1995 | Lin | |
| 5,452,792 A | 9/1995 | Zautke et al. | |
| 5,685,420 A | 11/1997 | Martin et al. | |
| 5,699,900 A * | 12/1997 | Artis | 206/5.1 |
| 5,993,755 A | 11/1999 | Andersen | |
| 6,038,997 A | 3/2000 | Madden | |
| 6,244,430 B1 | 6/2001 | Travis | |
| 6,382,409 B1 * | 5/2002 | Scala | 206/5.1 |
| 6,435,339 B1 | 8/2002 | Kroupe | |
| 7,042,805 B1 * | 5/2006 | Kallman | 368/10 |
| 2002/0069896 A1 | 6/2002 | Pankow | |
| 2002/0117405 A1 | 8/2002 | Wang et al. | |
| 2005/0258053 A1 * | 11/2005 | Sieg | 206/5.1 |
| 2006/0274263 A1 | 12/2006 | Yacktman et al. | |
| 2007/0284263 A1 * | 12/2007 | Giardina et al. | 206/5.1 |
| 2008/0179200 A1 * | 7/2008 | O'Hara et al. | 206/5.1 |

FOREIGN PATENT DOCUMENTS

| | | |
|---|---|---|
| EP | 0413164 | 11/1993 |
| EP | 0604177 | 6/1994 |
| EP | 0680865 | 11/1995 |
| JP | 07039414 | 2/1995 |
| JP | 2001255499 | 9/2001 |
| JP | 2002142837 | 5/2002 |
| WO | 94/24019 | 10/1994 |
| WO | 98/21995 | 5/1998 |
| WO | 99/11529 | 3/1999 |

* cited by examiner

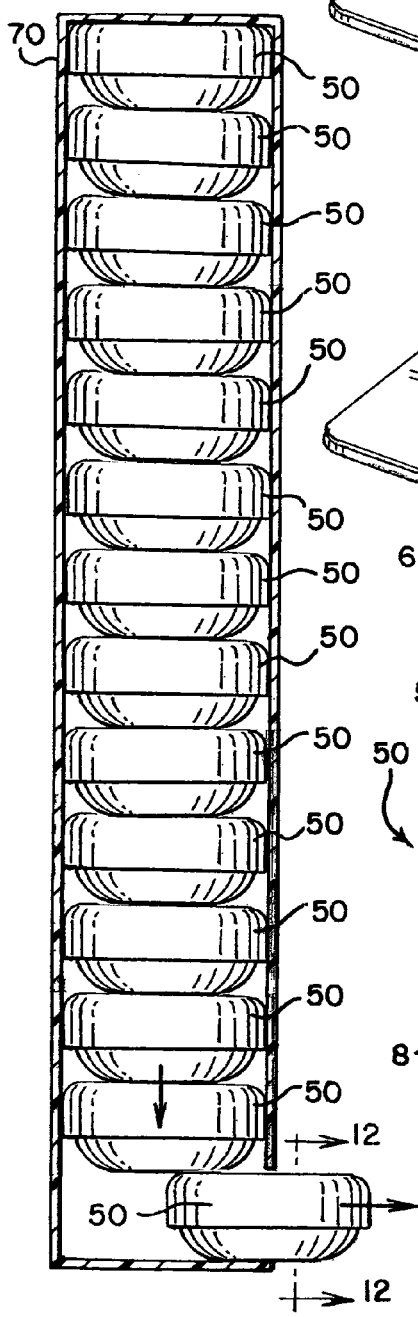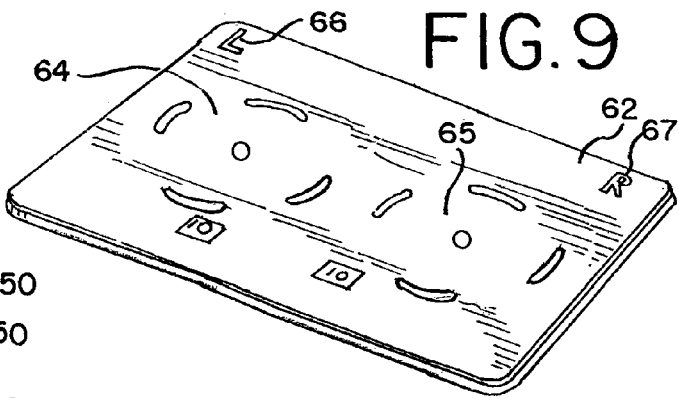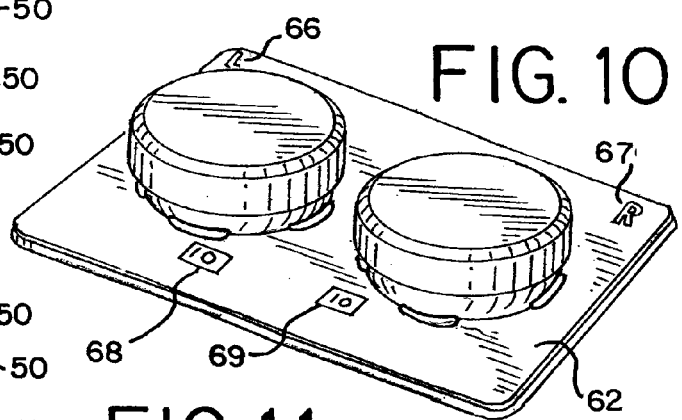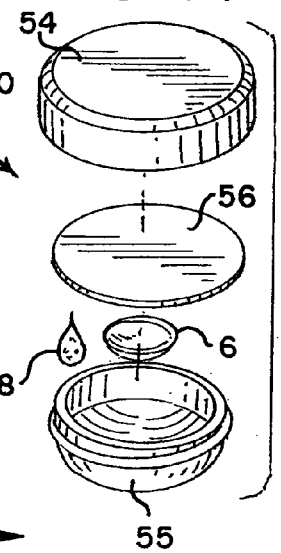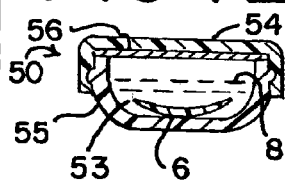

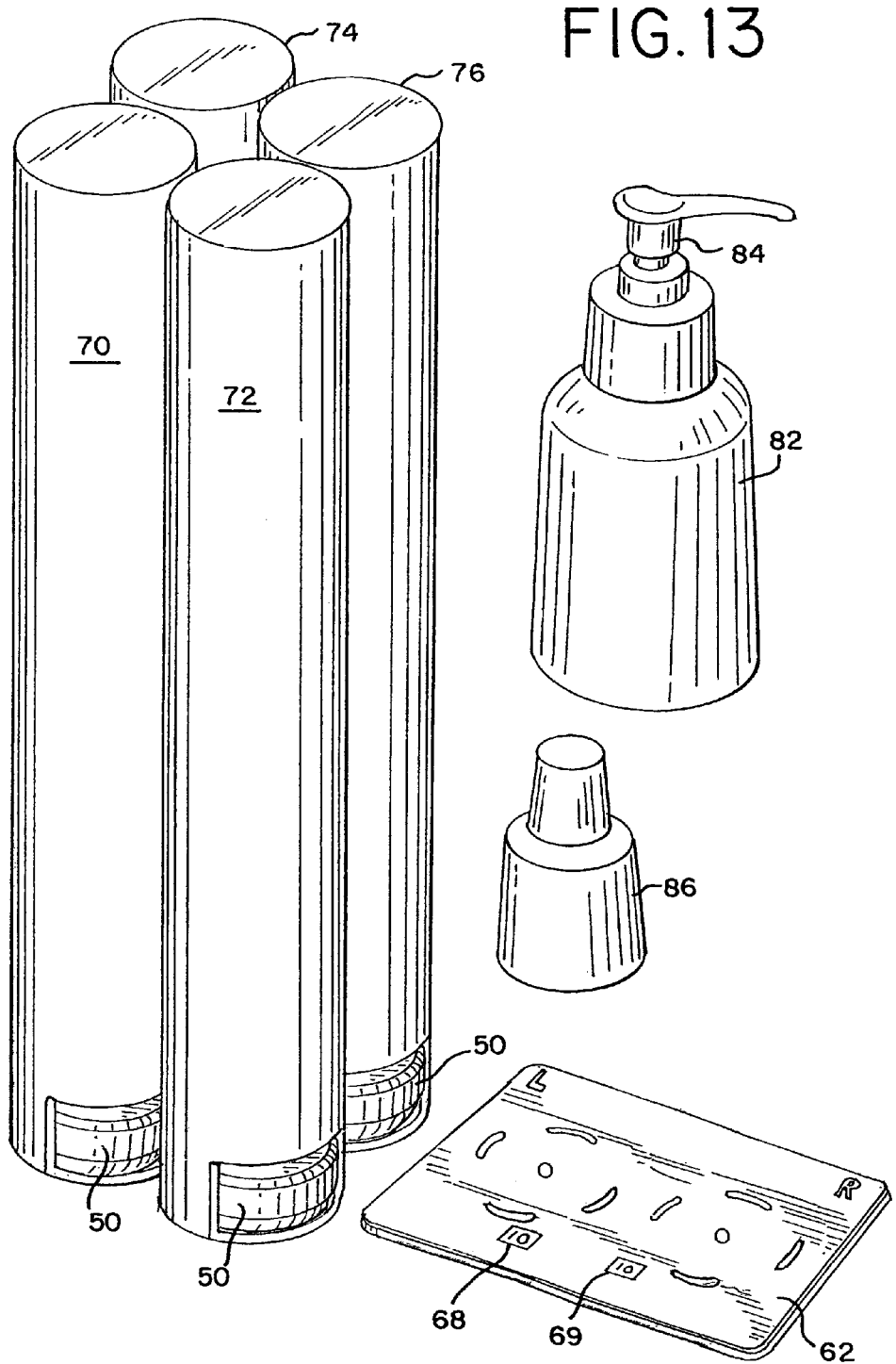

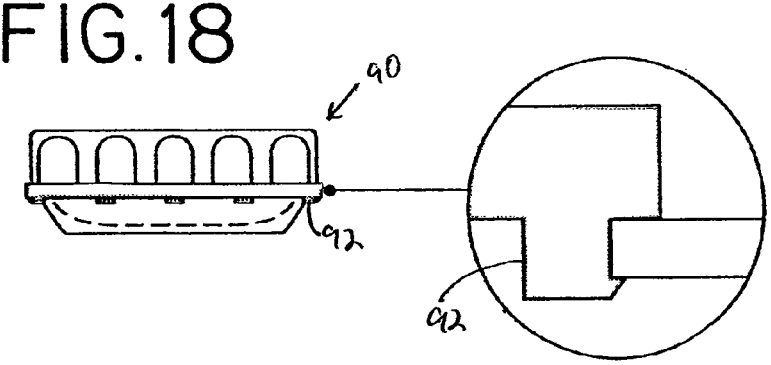
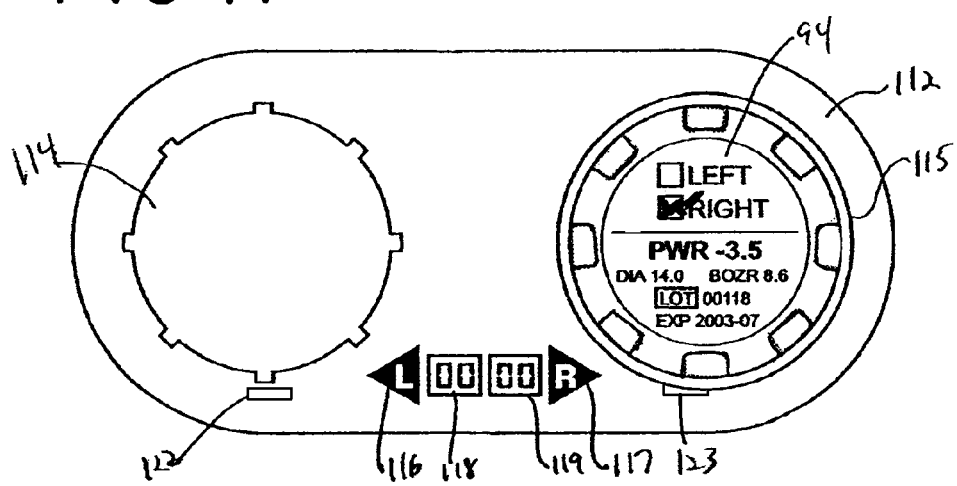
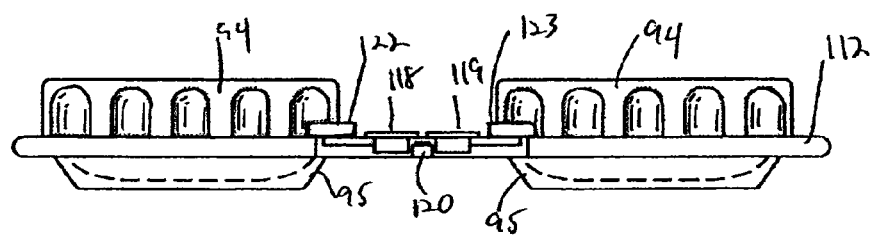

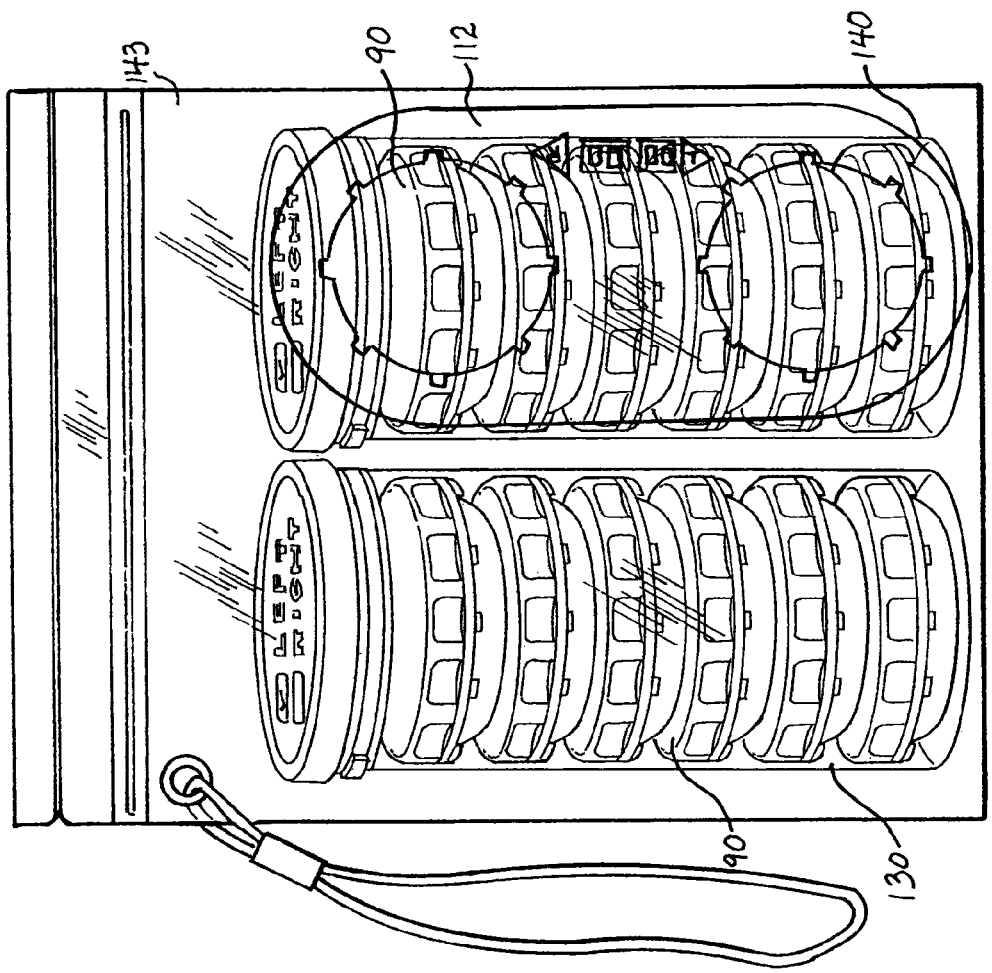
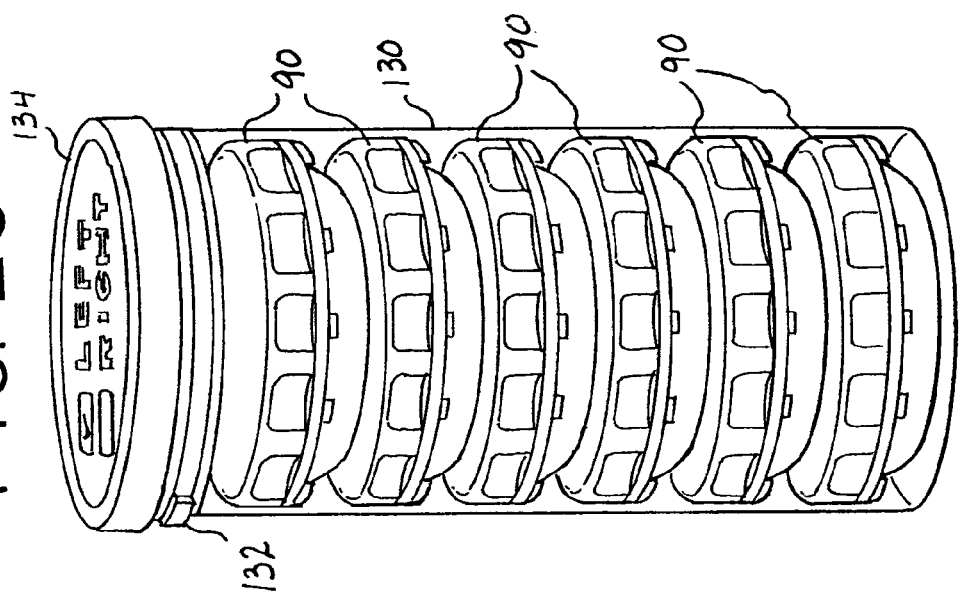

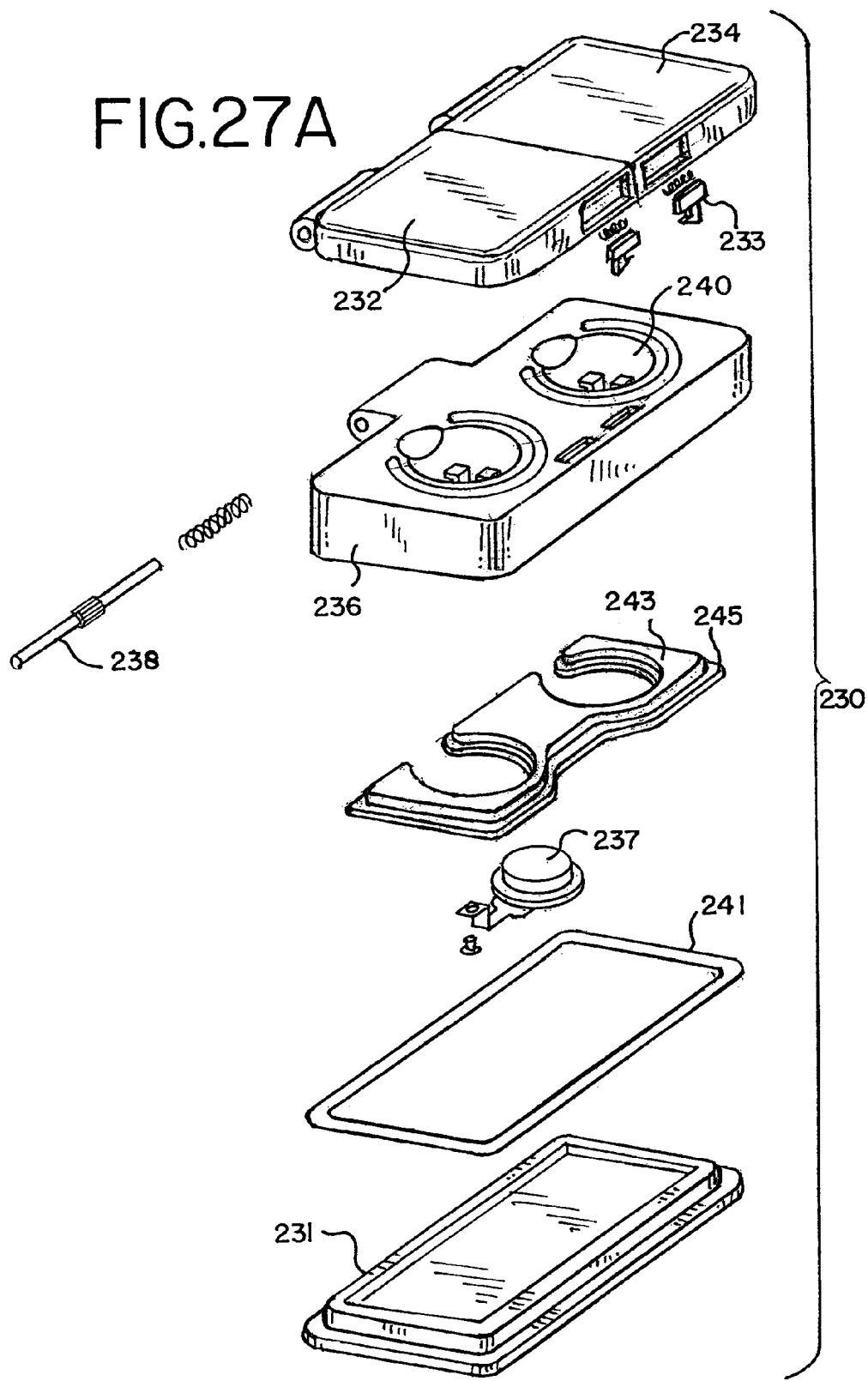

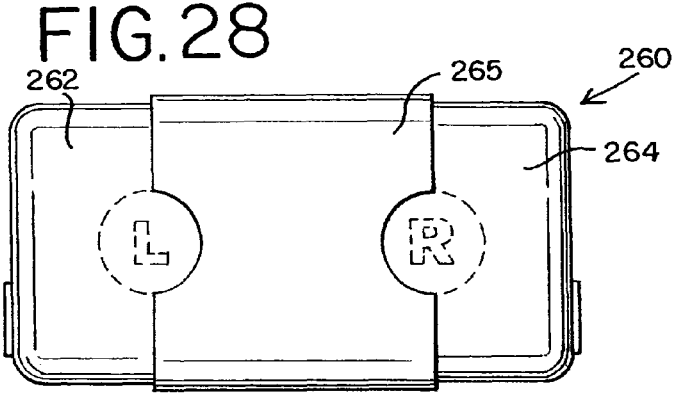
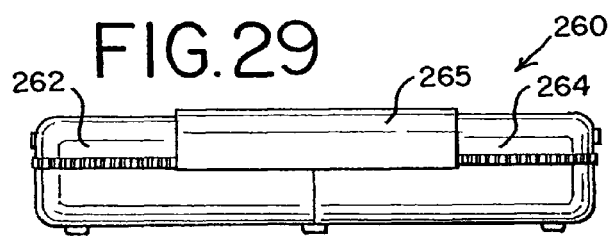
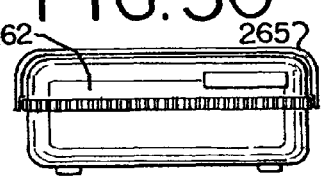
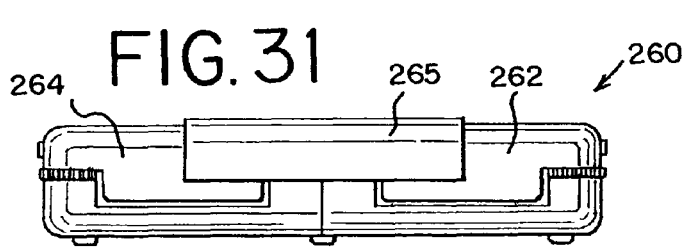
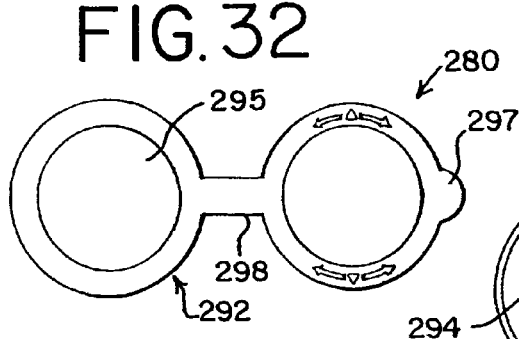
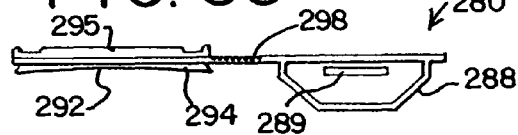
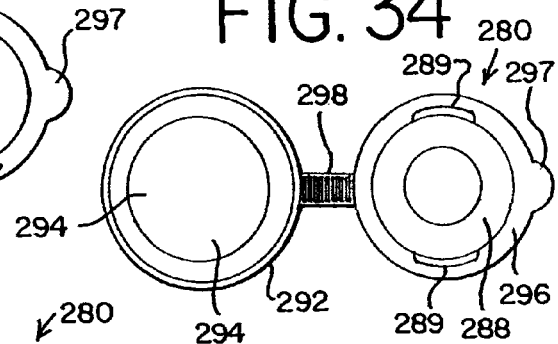

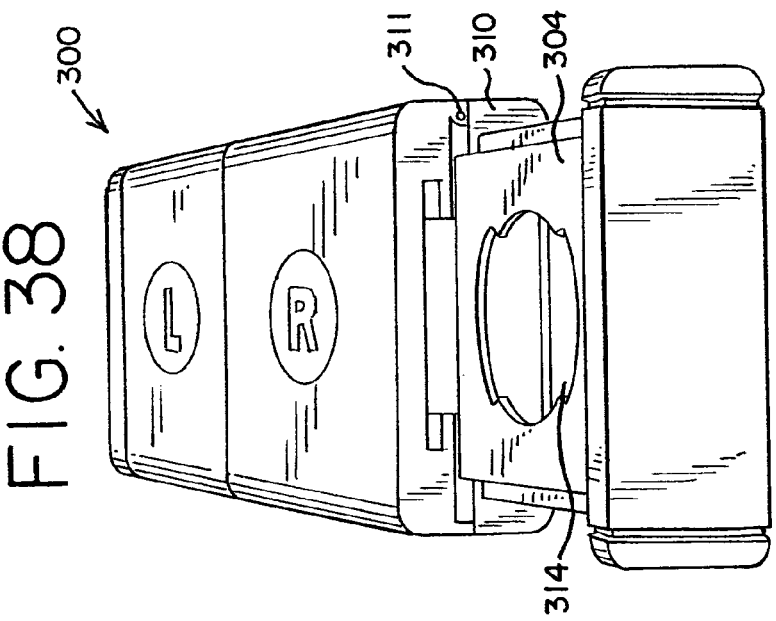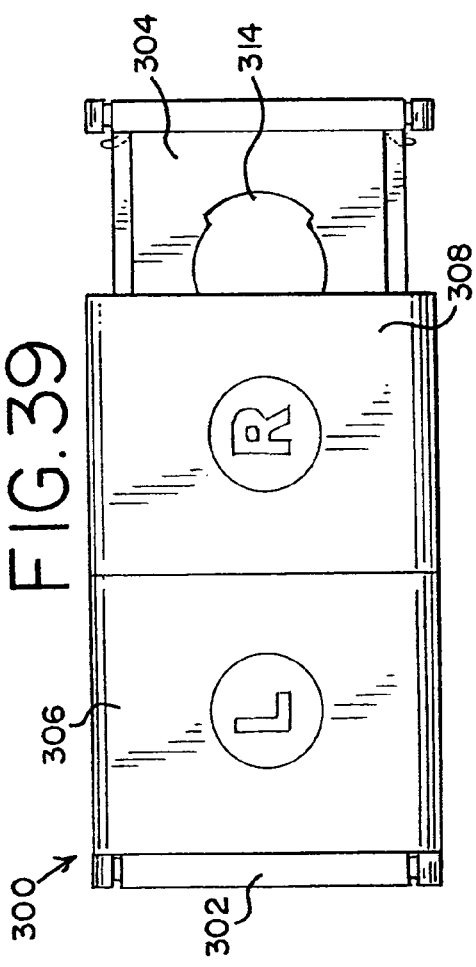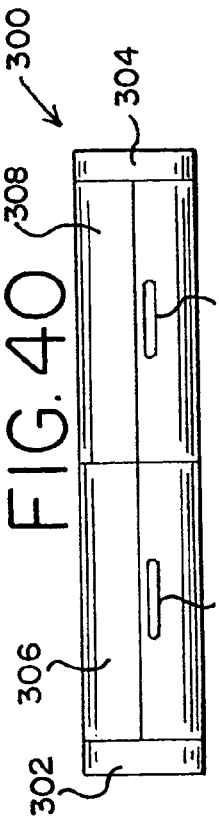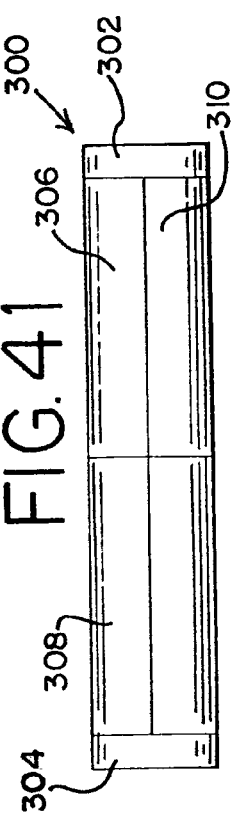

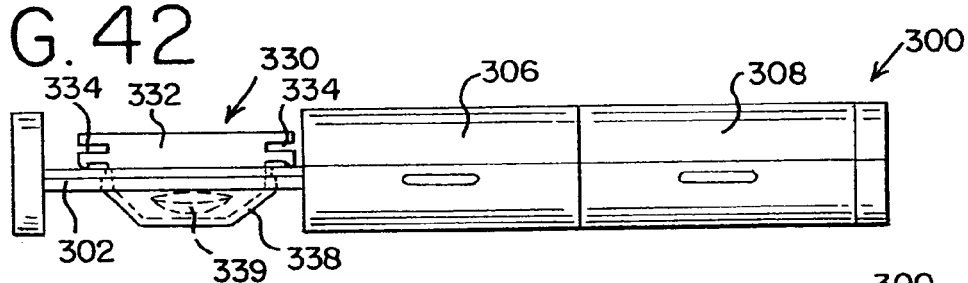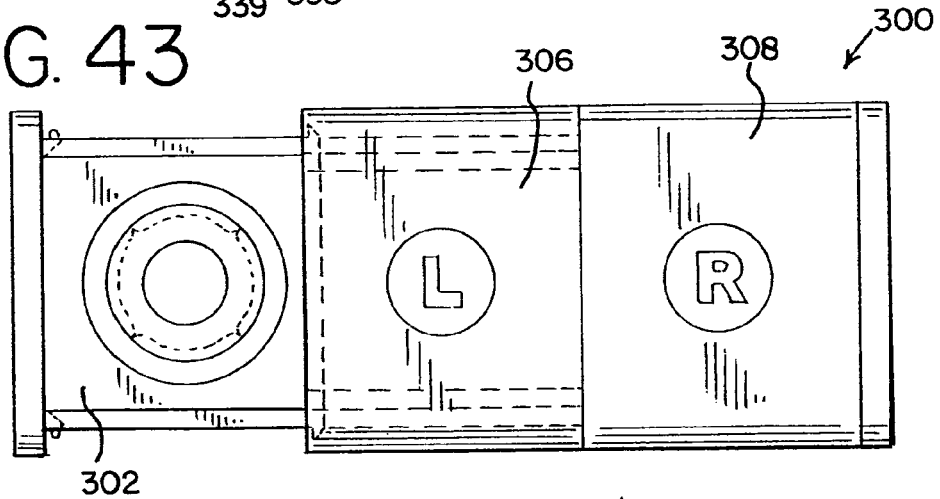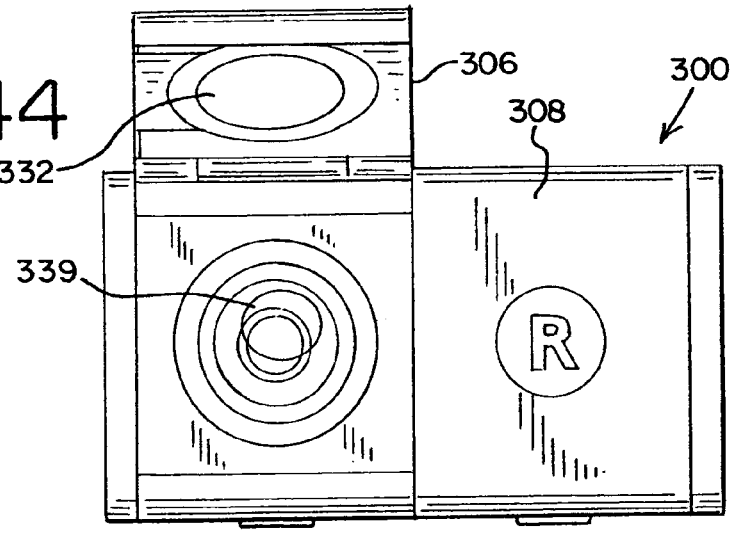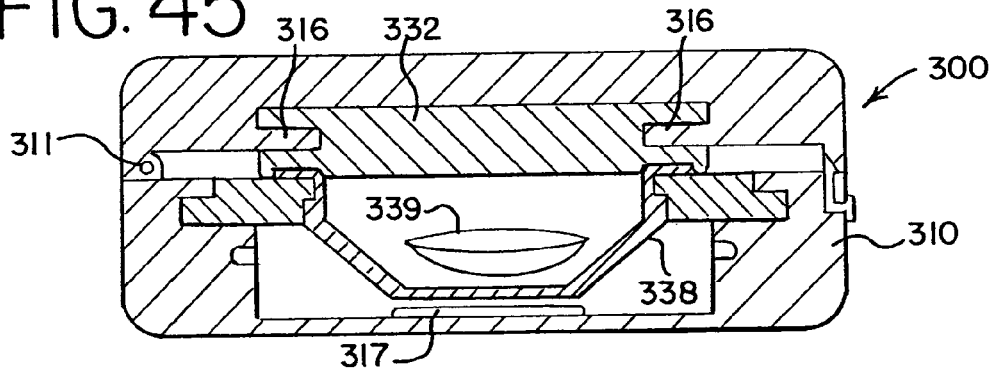

CONTACT LENS PACKAGE AND STORAGE CASE, HOLDER, AND SYSTEM AND METHOD OF MAKING AND USING

CROSS-REFERENCE TO RELATED PATENT APPLICATIONS

The present application is a Continuation application and claims priority of previous U.S. patent application Ser. No. 10/527,383, filed Mar. 11, 2005 (now U.S. Pat. No. 7,832,551). U.S. patent application Ser. No. 10/527,383 (now U.S. Pat. No. 7,832,551) is a nationalization and claims the priority under 35 U.S.C. §371 of a International patent application No. PCT/US03/28991, filed Sep. 15, 2003 and published as WO2004/024573. International Patent Application No. PCT/US03/28991 claims the priority of previous U.S. provisional patent application No. 60/410,773, filed Sep. 13, 2002. All of these applications are incorporated herein by reference in their respective entireties.

BACKGROUND OF THE INVENTION

Contact lenses are widely used to correct vision. Contact lenses have traditionally been either rigid (hard) or soft.

One important consideration in wearing contact lenses is eye health. Because contact lenses are placed directly on the eye, it is important that they not introduce any unwanted contamination into the eye.

The more commonly used soft contact lenses are designed for use over a specified number of days, and are then to be replaced. For example, many contact lenses are to be used for up to 14 days, after which they are to be disposed of. This routine replacement of soft contact lenses is highly desirable because it is difficult for the patient to sterilize or otherwise adequately clean the lenses, and after use over a period of days, they have a tendency to build up contamination.

A contact lens wearer must have a container or receptacle to store a currently used set of contact lenses when they are not being worn, such as when the wearer is sleeping. The storage container should enable the wearer to store the lenses in a suitable hydrating and anti-microbial solution and thus must be resealable. A typical contact lens storage case has two compartments that are marked or fashioned in some way in order to differentiate the right and left compartments. This is necessary because some wearers need a different prescription to correct the vision in their left eye compared to the prescription to correct the vision in their right eye. The typical storage cases thus provides a means for the user to remember which contact lens is made for which eye once lenses have been removed, as it is difficult to distinguish one contact lens from the other with the naked eye.

Soft contact lenses are often sold in multiple packages of lenses to supply the wearer with enough lenses to last for six months or a year. A typical package has a "blister" molded out of high quality polypropylene, with a contact lens and solution needed to keep it hydrated retained in the blister by a film which is sealed over the blister and secured to the margin area around the blister.

One problem that many wearers face is keeping track of the different lenses and knowing which eye they are for. The lenses are typically supplied by the manufacturer with a listing of the parameters (such as the power, diameter, base curve, etc.), but unless the dispensing optometrist indicates which eye they are for, the wearer must ascertain this for themselves. Even if the dispensing optometrist designates whether the lens is for a left or right eye on an outer package, individual contact lens packages do not contain that information. Additionally, once the outer packages have been opened, they are usually not fully resealable, and lens packages may fall out and be mixed up with others from another outer package when stored away. Furthermore, a majority of wearers have different prescriptions for each eye, but the differences are not great. Thus, if the wearer gets the lenses mixed up, it may take wearing the lenses for a while before the wearer realizes his or her vision is not as good as it should be and figures out that the lenses need to be switched.

Another problem that has not been heretofore addressed is the need to replace contact lens storage cases frequently. Even though many wearers realize that they need to dispose of lenses after the recommended wearing period, they do not realize that their lens storage case can become contaminated. Over time these storage cases can build up contaminants and become a breeding ground for microbes, even though the lens case is rinsed out each morning after the contact lenses are removed and placed in the wearer's eyes.

Some prior art references disclose contact lens packages that are suggested for use as the lens storage case. However, none of these designs have found widespread acceptance, and none are used by major manufacturers of contact lenses at the present time. Presumably, this is because the designs have been discovered to be impractical. For example, U.S. Pat. No. 5,224,593 discloses a combination lens shipper/lens case. However, it has several drawbacks. First, the bottom of the shipper/case is merely heat sealed on to the rest of the case, and it may gradually work its way loose over time. More importantly, the inside of the case is in the form of a cylinder, with a flat bottom which will make retrieving the lens quite difficult. Most contact lens cases have a concave bottom to facilitate lens removal.

Japanese patent publication 2001-255499 discloses another contact lens package that is suggested for use of lens storage case. The package includes a cover that fits down inside or depression. The cover and the fringe part surrounding the depression is then covered by a sheet film when the sheet film is peeled off, the cover sticks to it and opens. The lens can then be removed. Supposedly the cover can be placed back in the depression to reseal the blister. This design has several drawbacks. Most importantly, cover is smaller than the opening. As a result, it has to fit inside of the depression. As a result, it would be very difficult to make the cover exactly the right size so that it could provide a leak-proof seal, especially if the parts were mass produced.

Another problem faced by contact lens wearers is keeping track of how long a current pair of lenses has been worn. Some people favor daily disposable lenses for this reason. However, most soft lens wearers use lenses designed for replacement after two weeks or one month. For many people this period of time goes by with no good way to keep track of it. As a result, a person must either make a note on a calendar, or somewhere else, and constantly refer to the note, or they lose track of when they last started using the current pair of lenses and either dispose of them earlier than necessary or later than they should. This problem is exacerbated if the wearer tears or damages a lens during its normal wearing period and has to restart with a fresh lens and now monitor two wearing schedules.

Thus it can be seen that even though the benefits of soft contact lenses outweigh these problems, and their acceptance continues to grow, it would be of great benefit if one or more of these problems could be solved.

SUMMARY OF THE INVENTION

A contact lens package and storage case has been invented, along with a holder, and a system utilizing the case, that overcomes many of the foregoing disadvantages. In a primary form of the invention, the package that is used to store the lens between the time it is made and the time it is worn can also be used to store the lens after it has been worn. The package can then be disposed of when the lens is disposed of after it has been worn for its recommended period. Each lens comes with a new sterilized storage case. The package is configured such that it not only provides all of the properties needed in a contact lens package during product distribution, but it also has features that make it highly desirable as a storage case.

In a first aspect, the invention is a contact lens package that is reusable as a case to store a contact lens between uses comprising:

a) a bottom member having a well with an inside generally concave shape, and a wall rising above the well and ending in a top rim defining an opening;

b) a temporary seal comprising a generally moisture-proof film sealed across the top rim to seal the opening, thus defining a volume within the package, the volume containing a contact lens and contact lens fluid; and c) a cap secured to the bottom member covering the temporary seal, the cap being removable to give access to the temporary seal and replaceable on the bottom member thereafter to provide storage of the contact lens between uses thereof.

In a second aspect, the invention is a contact lens package and storage system comprising:

a) a generally flat base member having two receptacles and indicia identifying one of said receptacles as being for a left eye contact lens package and the other of said receptacles as being for a right eye contact lens package; and b) a plurality of contact lens packages each comprising:
        i) a bottom member configured to be received by one of said receptacles and held securely onto the base;
        ii) a cap secured to the bottom member to enclose a volume; and
        iii) a contact lens and contact lens fluid within said volume;

c) wherein the plurality of contact lens packages include a generally equal plural number of packages containing a contact lens to be used in the left eye of a contact lens wearer and packages containing a contact lens to be used in the right eye of the contact lens wearer.

In a third aspect, the invention is a method of distributing contact lenses comprising:

a) receiving an order from a contact lens wearer for a supply of contact lenses designed to be worn for a prescribed number of days, the order including lenses of a first prescription for use in the right eye of the wearer and lenses of a second prescription for use in the left eye of the wearer;

b) shipping the contact lenses requested in the order to the wearer in an outer package containing a plurality of individual contact lens packages, the plurality of individual contact lens packages comprising two different package types, a first of the package types containing lenses for the first prescription and the second of the package types containing lenses for the second prescription, the first and second package types being readily distinguishable from one another.

In a fourth aspect. the invention comprises a contact lens package and storage system comprising:

a) a generally flat base member having two receptacles, one of said receptacles being for a left eye contact lens package and the other of said receptacles being for a right eye contact lens package; and b) a plurality of contact lens packages each comprising:
        i) a bottom member configured to be received by one of said receptacles and held securely onto the base;
        ii) a cap capable of closing the bottom member to enclose a volume; and
        iii) a contact lens and contact lens fluid within said volume;

c) wherein the plurality of contact lens packages include a generally equal plural number of
        i) packages containing a contact lens to be used in the left eye of a contact lens wearer and
        ii) packages containing a contact lens to be used in the right eye of the contact lens wearer.

In a fifth embodiment the invention comprises a contact lens package that is reusable as a case to store a contact lens between uses comprising:

a) a bottom member having a well with an inside generally concave shape, and a wall rising above the well and -ending in a top rim defining an opening;

b) a temporary seal comprising a generally moisture-proof film sealed across the opening, thus defining a volume within the package, the volume containing a contact lens and contact lens fluid;

c) a cap that is placeable on the bottom member after removal of the temporary seal to provide storage of the contact lens;

wherein a foil covers the bottom member with the temporary seal and the cap.

In a sixth embodiment the invention comprises contact lens package that is reusable as a case to store a contact lens between uses comprising:

a) a bottom member having a generally concave shape;

b) a temporary seal comprising a generally moisture-proof film that seals an opening of the bottom member; and c) a cap wherein the temporary seal sealing the bottom member comprises a film that also covers and provides a temporary seal over the cap.

In a seventh embodiment the invention comprises a contact lens package that indicates whether a contact lens therein is to be worn in a left eye or a right eye, wherein the package is designated for use in the left or right eye by the contact lens manufacturer.

In an eighth embodiment the invention comprises contact lens package that indicates whether a contact lens therein is to be worn in a left eye or right eye, wherein the package is designated for use in the left or right eye by the contact lens wholesaler.

In a ninth embodiment the invention comprises contact lens package that indicates whether a contact lens therein is to be worn in a left eye or right eye, wherein the package is designated for use as containing a left eye lens or a right eye lens at the same time the package is marked with a prescription applicable to the lens therein.

In a tenth embodiment the invention comprises a method of packaging a contact lens wherein a contact lens is place in the package; the package is designated for use as containing a left eye lens or a right eye lens at the same time the package is marked with a prescription applicable to the lens therein.

In an eleventh embodiment the invention comprises a package containing lenses to be worn in a right eye and contact lenses to be worn in a left eye comprising:

a shipping package; and a plurality of individual contact lens packages;

wherein the individual contact lens packages are marked for use of the contact lens in either the left eye or the right eye prior to shipment.

In a twelfth embodiment the invention comprises a method of distributing an order for a contact lens comprising:

placing the contact lens with one prescription for the left eye in a package that indicates the contact is for use in the left eye;

placing the contact lens with a second prescription for the right eye in a package that indicates the contact lens is for use in the right eye; and shipping the order.

Additional embodiments include a contact lens package that is reusable as a case to store a contact lens between uses comprising:

a) a bottom member having a well with an inside generally concave shape, and a wall rising above the well and ending in a top rim defining an opening;

b) a temporary seal comprising a generally moisture-proof film sealed across the top rim to seal the opening, thus defining a volume within the package, the volume containing a contact lens and contact lens fluid; and c) a cap secured to the bottom member covering the temporary seal, the cap being removable to give access to the temporary seal and replaceable on the bottom member thereafter to provide storage of the contact lens between uses thereof.

In another embodiment the invention comprises a contact lens package and storage system comprising:

a) a generally flat base member having two receptacles and indicia identifying one of said receptacles as being for a left eye contact lens package and the other of said receptacles as being for a right eye contact lens package; and b) a plurality of contact lens packages each comprising:
  i) a bottom member configured to be received by one of said receptacles and held securely onto the base;
  ii) a cap secured to the bottom member to enclose a volume; and
  iii) a contact lens and contact lens fluid within said volume;

c) wherein the plurality of contact lens packages include a generally equal plural number of packages containing a contact lens to be used in the left eye of a contact lens wearer and packages containing a contact lens to be used in the right eye of the contact lens wearer.

In another embodiment the invention comprises a method of distributing contact lenses comprising:

a) receiving an order from a contact lens wearer for a supply of contact lenses designed to be worn for a prescribed number of days, the order including lenses of a first prescription for use in the right eye of the wearer and lenses of a second prescription for use in the left eye of the wearer;

b) shipping the contact lenses requested in the order to the wearer in an outer package containing a plurality of individual contact lens packages, the plurality of individual contact lens packages comprising two different package types, a first of the package types containing lenses for the first prescription and the second of the package types containing lenses for the second prescription, the first and second package types being readily distinguishable from one another.

In an additional embodiment the invention comprises a reusable holder for contact lens cases comprising:

a) a lid;
b) a base;
c) one or more receptacles for a contact lens case; and
d) a time keeping device;

wherein the time keeping device comprises an indicator for each one or more receptacles that indicates a period of time that has elapsed since the contact lens case currently in the receptacle was placed therein.

In another embodiment the invention comprises a contact lens package that is reusable as a case to store a contact lens between uses comprising:

a) a bottom member with a well and a contact lens therein;
b) a temporary seal over the bottom member; and
c) a cap;

wherein the bottom member with the temporary seal and the cap have a removable protective foil covering; and wherein the foil provides a connection between the bottom member and the cap.

In preferred embodiments of the invention, the package and storage case includes a pull tab to allow the wearer to easily remove the temporary sealing film. The preferred storage base includes an indicator which shows how many days it has been since the contact lens package secured to the base was replaced, thus helping to remind a wearer when it is time to replace the lens and storage case. Preferably, this indicator gets automatically restarted when a new package is put in place in the receptacle on the base.

These and other advantages of the invention, as well as the invention itself, will be best understood in view of the attached drawings.

BRIEF DESCRIPTION OF THE DRAWINGS

FIG. 8 is a partial cross-sectional view of a shipping package containing a six month supply of contact lens packages and storage cases of a fourth embodiment of the present invention.

FIG. 9 is a perspective view of a base used with the contact lens package and storage case of FIG. 8.

FIG. 10 is a perspective view of the base of FIG. 9 and two contact lens packages and storage cases of FIG. 8 secured to the base.

FIG. 11 is an exploded view of the contact lens package and storage case of FIG. 8.

FIG. 12 is a cross-sectional view taken along line 12-12 of FIG. 8.

FIG. 13 is a perspective view of a first embodiment of a contact lens package and storage system using components shown in FIGS. 8-12.

FIG. 17 is a top plan view of a second embodiment of a base used with the contact lens package and storage case of FIG. 14.

FIG. 18 is an enlarged cross-sectional view showing how the contact lens package and storage case of FIG. 14 is secured into the base of FIG. 17.

FIG. 19 is a side elevational view of the base of FIG. 17 with two contact lens packages and storage cases of FIG. 14 in place.

FIG. 20 is a perspective view of a shipping tube for use with the contact lens packages and storage cases of FIG. 14.

FIG. 21 is a side elevational view partly broken away showing a second embodiment of a contact lens package and storage system using the components shown in FIGS. 14, 17 and 20.

FIG. 27a is an exploded view of the contact lens case holder of FIG. 26.

FIG. 28 is a plan view of a second contact lens case holder of the present invention.

FIG. 29 is a front elevational view of the contact lens case holder of FIG. 28.

FIG. 30 is a side elevational view of the contact lens case holder of FIG. 28.

FIG. 31 is a rear elevational view of the contact lens case holder of FIG. 28.

FIG. 32 is a plan view of an eighth embodiment of a contact lens package and storage case of the present invention.

FIG. 33 is a side elevational view of the contact lens package and storage case of FIG. 32.

FIG. 34 is a bottom plan view of the contact lens package and storage case of FIG. 32.

FIG. 38 is a perspective view illustrating a third embodiment of a contact lens case holder.

FIG. 39 is a plan view of the contact lens case holder of FIG. 38.

FIG. 40 is a front elevational view of the contact lens case holder of FIG. 38.

FIG. 41 is a rear elevational view of the contact lens case holder of FIG. 38.

FIG. 42 is a front elevational view of the contact lens case holder of FIG. 38 illustrating a side opening with a contact lens inserted.

FIG. 43 is a plan view of the contact lens case holder of FIG. 38 with the left lid as transparent to show the interior of the case.

FIG. 44 is a plan view of the contact lens case holder of FIG. 38 with a contact lens package and storage case inserted, the side opening closed and the left lid open.

FIG. 45 is a cross-sectional view of the contact lens case holder of FIG. 38 illustrating a contact lens package and storage case and contact lens therein.

DETAILED DESCRIPTION OF THE DRAWINGS AND PREFERRED EMBODIMENTS OF THE INVENTION

Figure 6:
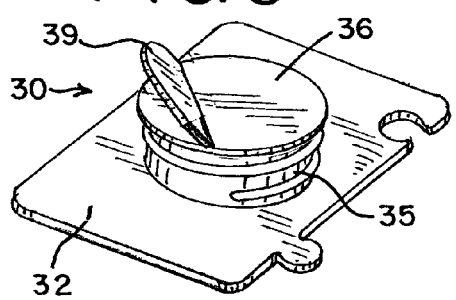
FIG. 6 is a perspective view like FIG. 3 but of a second embodiment of a contact lens package and storage case of the present invention.
Figure 7:
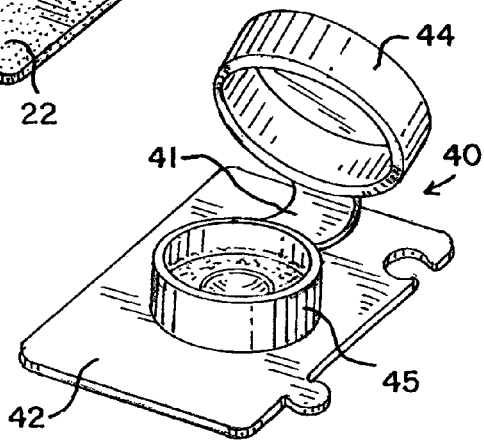
FIG. 7 is a perspective view of a third embodiment of a contact lens package and storage case of the present invention.
Figure 14:
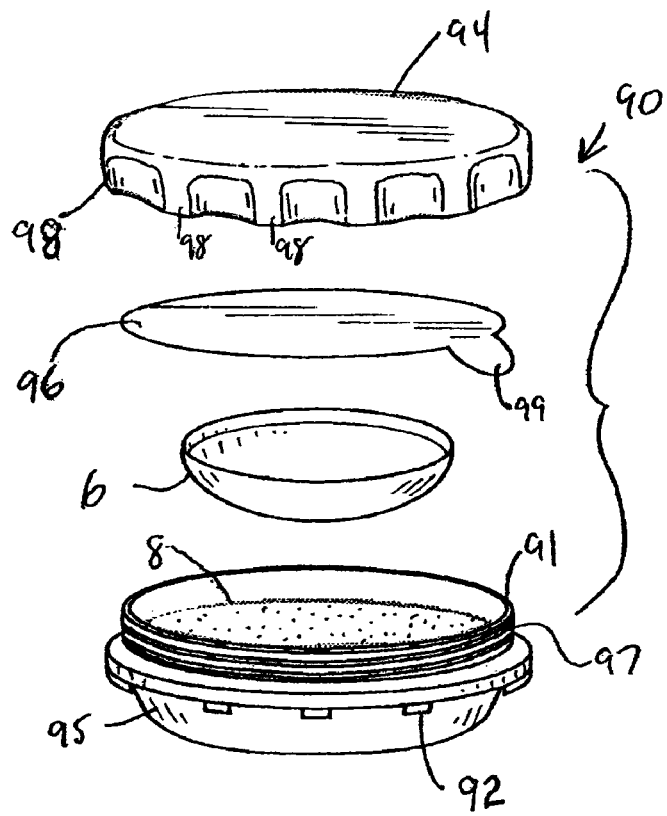
FIG. 14 is an exploded view of a fifth embodiment of a contact lens package and storage case of the present invention.
Figure 15:
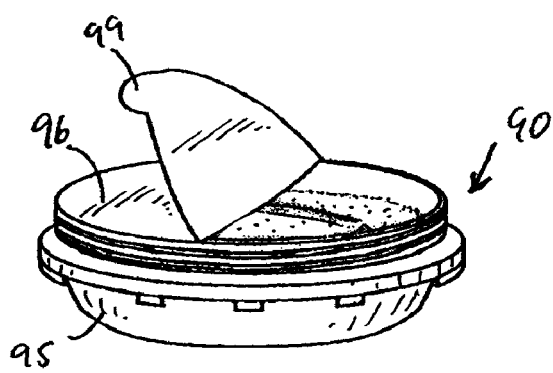
FIG. 15 is a perspective view of the contact lens package and storage case of FIG. 14 with the cap removed and the temporary seal partially removed.
Figure 16:
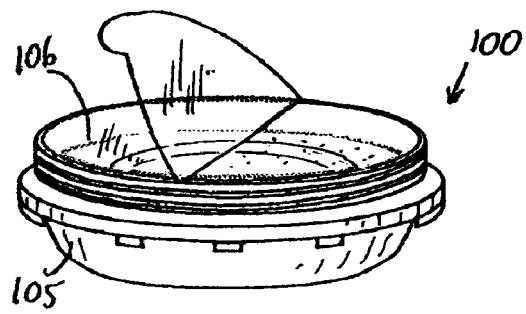
FIG. 16 is a perspective view like FIG. 15 but of a sixth embodiment of a contact lens package and storage case of the present invention.
Figure 23:
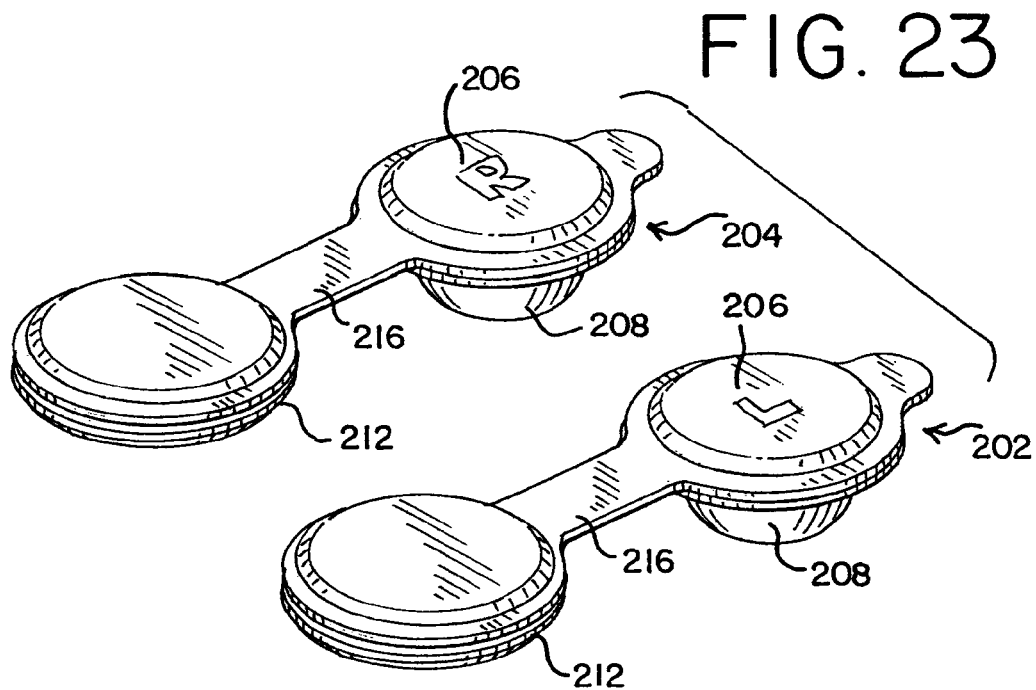
FIG. 23 is a perspective view of two contact lens packages and storage cases of a seventh embodiment of the invention.
Figure 24:
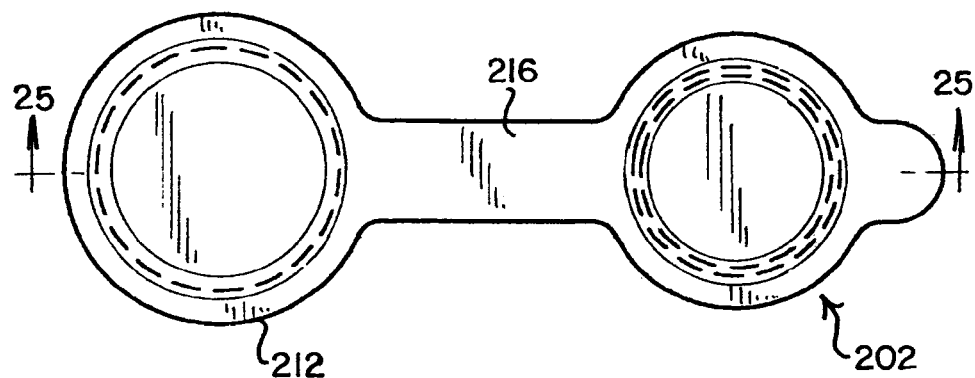
FIG. 24 is a plan view of the contact lens package and storage case of FIG. 23.
Figure 25:
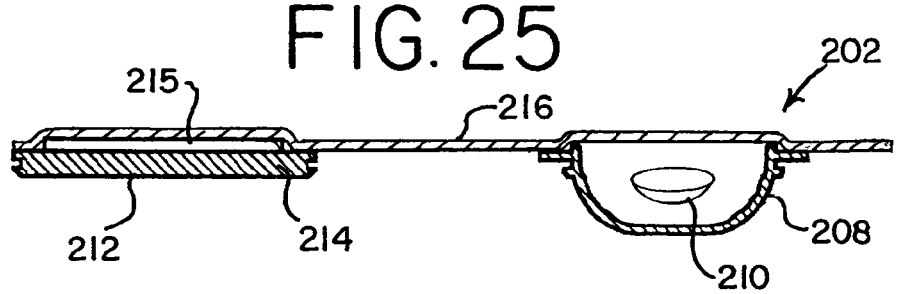
FIG. 25 is a cross-sectional view taken along line 25-25 of FIG. 24.
Figure 26:
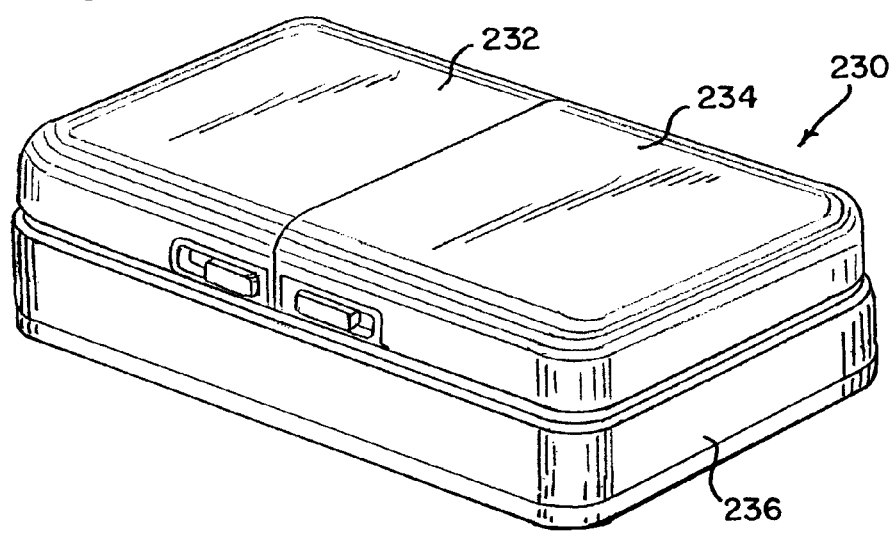
FIG. 26 is a perspective view of a first contact lens case holder of the present invention, including a base for holding two contact lens package and storage cases of FIG. 23.
Figure 27:
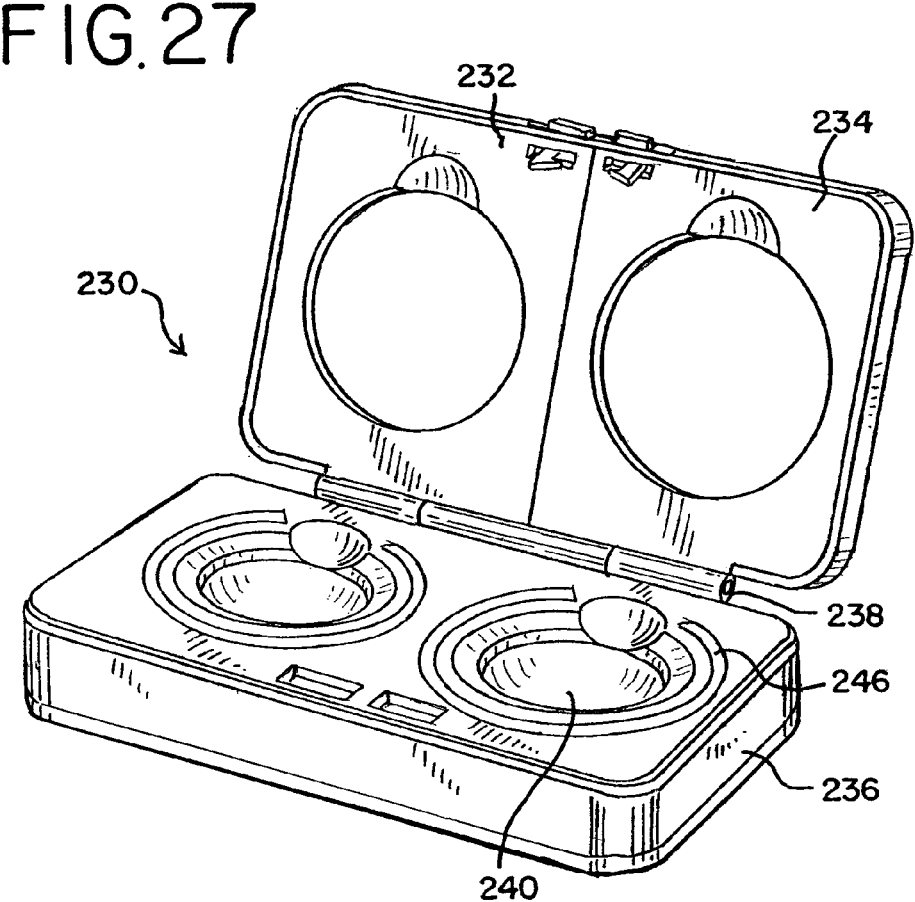
FIG. 27 is a perspective view of the contact lens case holder of FIG. 26, showing the lid open.
Figure 46:
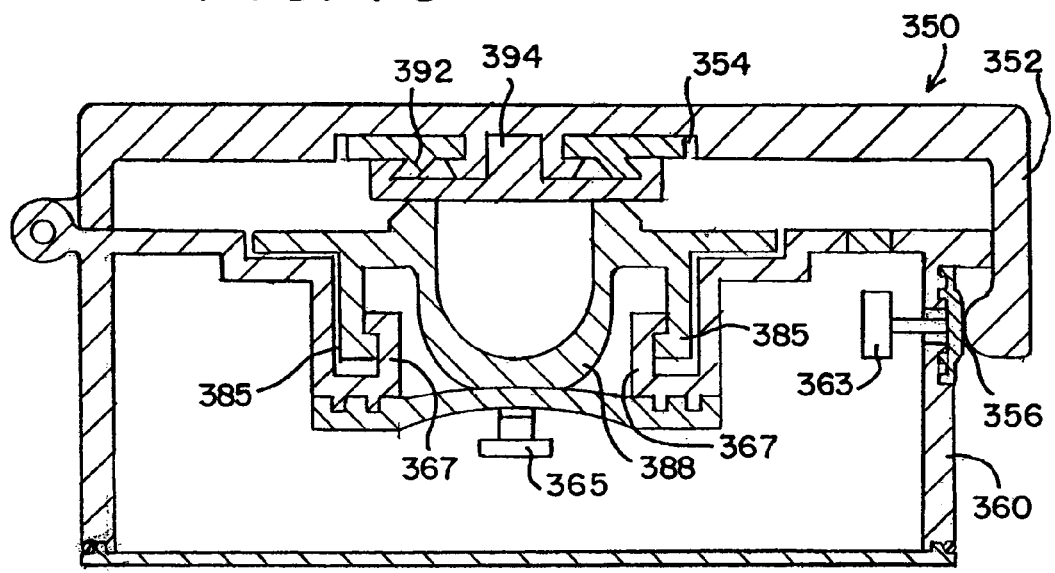
FIG. 46 is a cross-sectional view of a fourth embodiment of a contact lens case holder.

There are eleven illustrated embodiments of the contact lens package of the present invention, which is reusable as a case to store a contact lens between uses. These are shown in FIGS. 1-5; FIG. 6; FIG. 7; FIGS. 8-12; FIGS. 14-15; FIG. 16; FIGS. 23-25; FIGS. 32-35; FIGS. 42-45; FIG. 46; and FIG. 47, respectively. There are also five illustrated contact lens case holders, show in FIGS. 9,11 and 13; FIGS. 17-19 and 20-21; FIGS. 26-27A; FIGS. 28-31 and 35-37; FIGS. 39-45; and FIG. 46, respectively. There are also four illustrated contact lens package and storage systems, shown in FIGS. 8-10; FIG. 13; FIGS. 20-21; and FIG. 22, respectively. Of course the preferred contact lens case holders and package and storage systems use the preferred contact lens package and storage cases, as will become evident.

Figure 1:
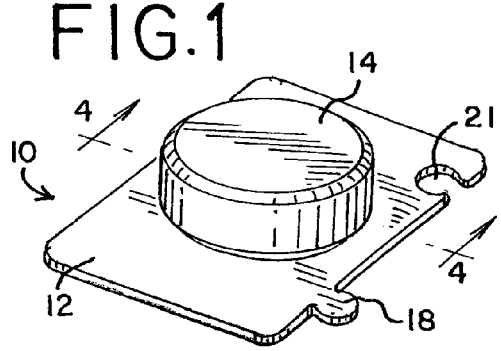
FIG. 1 is a perspective view of a first embodiment of a contact lens package and storage case of the present invention.
Figure 2:
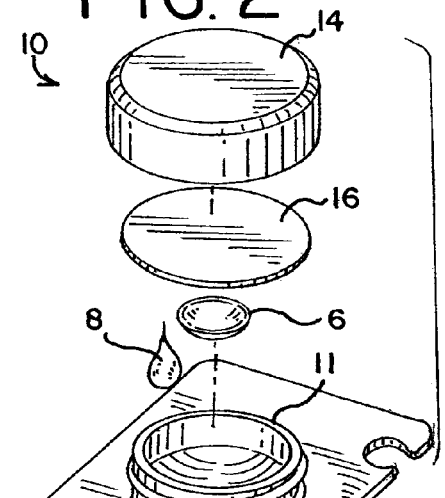
FIG. 2 is an exploded view of the contact lens package and storage case of FIG. 1.
Figure 3:
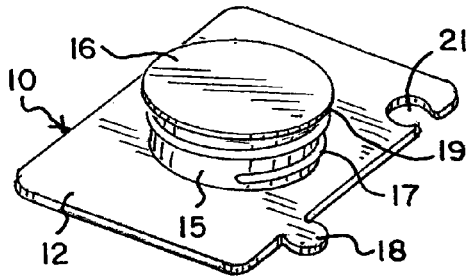
FIG. 3 is a perspective view of the contact lens package and storage case of FIG. 1 with the cap removed.
Figure 4:
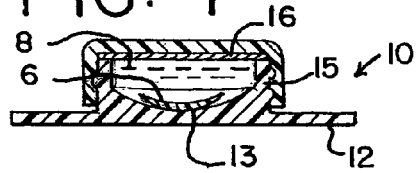
FIG. 4 is a cross-sectional view taken across line 4-4 of FIG. 1.

A first contact lens package and storage case 10, as shown in FIGS. 1-5, includes a generally flat base 12, a bottom member 15, a temporary seal made from a disk 16 of generally moisture-proof film and a cap 14. Of course, initially the case 10 will also contain a contact lens 6 and contact lens fluid 8. The base 12 and bottom member 15 may be formed as one monolithic unit, as shown in FIG. 4. The base 12 is generally flat and extends outwardly from the bottom member to provide stability to the case 10. The bottom member has a well 13 inside, with a generally concave shape, and a wall rising above the well and ending in a top rim 11 defining an opening to the bottom member 15.

A circular disk 16 of generally moisture-proof film is sealed across this opening by being heat or ultrasonically sealed to the rim 11 after the contact lens 6 and fluid 8 have been deposited in well 13. Preferably, as shown in FIG. 3, the disk 16 is slightly larger in diameter than the rim 11, leaving a marginal edge 19 of the film, or may include a small tab for the wearer to begin peeling off the rim 11 when the package is opened. A cap 14 is screwed on to the bottom member 15, covering the disk 16. As shown in the drawing, the cap completely covers the top rim. The bottom member 15 includes threads 17 which engage with threads (not shown) on the inside of cap 14 to secure the cap to the bottom member. This entire assembly, including the lens 6 and fluid 8, can then be subject to autoclave temperatures (120° C. for 30 minutes).

When the wearer is ready to use the lens the cap 14 is removed to give access to the temporary seal. After this is removed and the contact lens 6 is worn, the lens 6 can be placed back in the well 13. The cap 14 can then be placed back over the bottom member 15 to use the case 10 for temporary lens storage. The threads allow the cap 14 to be secured onto the bottom member 15 with a liquid-tight, leak-proof closure.

The bottom member 15 and cap 14 are preferably made of a high quality polypropylene that does not contain additives that could leach out. The polypropylene should be a homopolymer so that it has minimal impurities. It is also possible to use other polymers, particularly polyolefins, such as high density polyethylene (HOPE) or other materials familiar to those in the art to make the bottom member and cap.

The disk 16 is preferably an opaque film made of a lamination of polypropylene, aluminum foil and PET. The rim 11 is wide enough to receive sufficient surface area of the disk 16 such that an appropriate sealing strength and integrity is achieved via heat or ultrasonic sealing means. Of course other sealing films could be used. including those which are transparent.

Figure 5:
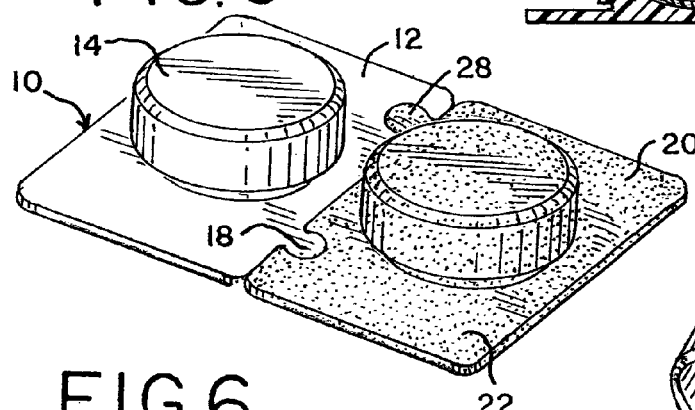
FIG. 5 is a perspective view of the contact lens package and storage case of FIG. 1 and a second contact lens package and storage case of a different color interlocked together.

The base 12 of case 10 is preferably configured to be interlocked with a base of a second package 20 having a base 22 with an identical configuration, as shown in FIG. 5. This may be accomplished by including a puzzle lock tab 18 and a mating space 21 on the base. Two packages 10 and 20 may then be snapped together by putting tab 28 of case 20 in the hole 21 of case 10, and likewise the tab 18 of case 10 in a similar hole in the base 22 of case 20. If case 10 is for holding a left eye contact, and case 20 is for holding a right eye contact, cases 10 and 20 will preferably be readily distinguishable from one another. In the embodiment of FIG. 5, case 10 is clear and case 20 is colored. Alternatively, both cases could be made of different colored plastic. Of course other ways of distinguishing cases 10 and 20 could be used, such as by including a letter "L" on case 10 and a letter "R" on case 20. It is preferable, though not necessary, for the base 12, bottom member 15 and cap 14 to be made out of the same color of material.

A second embodiment of a contact lens package and storage case 30 is shown in FIG. 6. The case 30 is just like case 10, with a base 32 and sealing disk 36. The cap is not shown for sake of clarity. In this embodiment, the film making up the disk 36 has a pull tab 39 fixedly attached to the film to allow a user to more easily remove the film from the bottom member 35 by grasping and pulling on the tab 39. Rather than constituting an extended section of the film outside the perimeter of the seal like the marginal edge 19, the pull tab 39 is attached to the film in the area circumscribed by the seal.

In the embodiment shown in FIG. 7, the cap 44 on case 40 has an interference snap-on fit securing it to the bottom member 45; again providing a leak-proof closure. A flexible strap 41 connects the cap 44 to the bottom member 45. Alternatively, the strap 41 could connect the cap 44 to the base 42.

Rather than including a base 12, the contact lens package and storage case could be designed to fit into a separate base. Such an embodiment is shown in FIGS. 8-13. The case 50 has a bottom member 55, a disk 56 and cap 54, similar to the case 10. As delivered to the user, the case 50 includes a contact lens 6 and contact fluid 8 as well. The inside of the bottom member forms a well 53 with a concave shape.

The contact-lens package and storage system shown in FIGS. 8-13 includes a separate, generally flat base member 62 having two receptacles 64 and 65. The base also includes indicia 66 and 67 identifying each receptacle as being for either a contact lens case for the left eye contact or a case for the right eye contact. The receptacles 64 and 65 receive the bottom members 55 of the case 50. The base 62 may further include indicators 68 and 69, one for each receptacle, which indicates the number of days that have elapsed since the package currently in the receptacle was placed therein.

The system also includes a first tube 70 filled with packages of contact lens 50 (FIG. 8) and a second identical tube. Packages of left eye contacts are stacked on top of one another in the first tube 70, and packages for the right eye contact lenses are stacked on top of one another in tube 74 (FIG. 13). Of course, as shown in FIG. 13, the supply of contact lens packages for each eye may fill more than one tube. In the embodiment of FIG. 13, there is a second tube 72 of left eye contact lens packages and a second tube 76 of right eye contact lens packages.

The tubes 70, 72, 74 and 76 may each contain a specific number of lenses which suits the wearing modality or the purchasing preferences of the wearer, such as a six month supply of two-week lenses. When one package 50 is removed, the next one falls down into place. A system sent to a customer may also include a bottle of multipurpose contact lens solution 82. This bottle could be equipped with a pump 84 or some other kind of push down system so that it dispenses an exact amount of solution (such as 3 ml) with one push. This would allow the bottle 82 to stay in place during use instead of a wearer having to pick up the bottle and carefully squirt out 3 ml of solution to fill the bottom member 55 when a contact lens 6 is placed in the package 50 for temporary (overnight) storage. The system supplied could also include a small bottle 86 for drops of a specialized fluid, such as wetting drops.

Another contact lens package and storage case 90 is shown in FIGS. 14 and 15. Like the embodiment of FIGS. 8-13, the case 90 has a bottom member 95 but no flat base extending therefrom. It may include a small optically transparent section on the base of the package to facilitate the inspection or examination of the contact lens through the package whilst it is undergoing certain manufacturing processes. The cap 94 has finger grips 98 molded into the circumference to help the user twist cap 94 onto the threads 97 formed on the bottom member 95. A temporary seal is provided by a film disk 96, which includes a pull tab 99, used to help tear the disk 96 from its sealing engagement with rim 91. FIG. 15 shows the case 10 with the cap 94 removed and the disk 96 partially removed.

An almost identical embodiment of a case 100 is shown in FIG. 16. In this embodiment the disk 106 sealed to the bottom member 105 is a transparent film instead of the opaque film 96 used in case 90. This would facilitate the inspection or examination of the contact lens through the sealed package either during the manufacturing process or before the patient removes the lens.

The case 90 is used with a base 112 in a second embodiment of a contact lens package and storage system shown in FIGS. 17-21. The base 112 include two receptacles 114 and 115 and indicia 116 and 117 which identify the respective receptacle for a left eye contact lens case or a right eye contact lens case. The indicia may be fashioned in such a way as to provide tactile identification of the base orientation. The base 112 also includes indicators 118 and 119 for each receptacle to indicate the number of days elapsed since the package currently in the receptacle was placed therein. The indicators are preferably electronic or electrochemical indicators, and may be part of one assembly to save cost. They may be prompted to indicate the days by counting from the moment the reset device is triggered (this would occur when the old package is pressed out of the base or when the new package is pressed in), and they may also change color once a certain number of days has passed. A battery 120 (FIG. 19) provides power to the electronic indicators and would preferably last for a year or more. This would remove the need for the wearer to change it. The electronics would be of a standard type familiar to those in the art and used in similar applications and could include a facility to offer further functions, such as time of day etc.

The receptacles each include a switch 122 and 123 which is activated by the process of placing a contact lens package in the receptacle. Activation of the switch 122 or 123 causes the indicator 118 or 119 to reset and start timing again. Preferably the electronic components, such as the indicators, an e-prom and switches, could be insert molded into the base when the base is formed by injection molding.

The bottom member 95 of this embodiment comprises at least one tab and preferably a plurality of tabs 92 (FIGS. 14 and 18) that have press-in selflocking corners that engage the base 112 and hold the bottom member 95 in the receptacle 114 or 115. The receptacles 114 and 115 in the base 112 have mating notches for receiving the tabs 92. With the tabs in the notches, the bottom member 95 is prevented from rotating in the base 112. As shown in FIG. 18, the corners of the tabs 92 are designed to snap into place, but preferably will shear off or deform when the bottom member is removed from the receptacle.

The base 112 is preferably made of a material which will receive the packages snugly and not deform and can be washed repeatedly. It could be made from plastic about ⅛ inch (3 mm) to ¼ inch (6 mm) thick, or from some other material and thickness which suits the purpose and style. This base contains the display and battery which are sealed within the base in order to remain waterproof. The base may have a laminated bottom. If needed, the base can include other fixtures applied in discreet areas to ensure that it is stable when resting on a flat surface, especially if the bottom surfaces of the bottom members 95 are rounded rather than flat.

As seen in FIG. 17, the cap 94 contains lens parameter information, as well as a left and right designation, a place for a check mark to be made by each designation, and a check mark in one of the places. This check mark is applied when the lenses are pulled from inventory to be supplied to a wearer. Alternatively, an inventory of pre-marked packages of both left and right eye lenses may be maintained. In still another alternative, an inventory of premarked caps of both left and right eye (possibly of a different color) may be maintained so that the packages can be designated as being for one eye or the other during assembly of a package. In this manner the packages are readily distinguishable from one another as being for a left eye or a right eye. In this fashion, the packages actually comprises two different package types. With this distinction, a plurality of individual contact lens packages can be shipped to a wearer, and the wearer will readily be able to tell which lenses are for which eye. One package type, marked for the left eye, contains lenses with a first prescription, and the second package type, marked for the right eye, contains lenses with a second, different prescription.

FIG. 20 shows a shipping tube 130 in which the packages 90 may be shipped. A tamper evident seal 132 may be applied to seal the top of the tube 130. The tube top 134 may also include indicia as to whether the lenses are for the left eye or the right eye.

An entire system with two tubes 130 and 140 of contact packages 90, and a base 112 may be packed in a secondary shipping pack 143, as shown in FIG. 21. The wearer orders a supply of contact lenses with a first prescription for the left eye and with a second prescription for the right eye. The individual lens packages are taken from inventory and marked (or an inventory of one type of lens in both right eye and left eye designated packages is maintained and used), and the individual packages are placed in a shipping tube. The tubes and a new base 112 are shipped to the wearer in the outer secondary shipping pack 143. The wearer takes the appropriate packages 90 and snaps them into place in the proper receptacles, which starts the timers and LCD indicators running. The wearer removes the caps and the temporary sealing disks, and uses the lenses. At night the lenses are returned to the proper bottom member and the caps put back on. After the wearer has worn the lenses for the appropriate number of days, which is being tracked and displayed on the LCD indicators, the lenses are disposed of, the bottom members 95 are removed from base 112, the bottom members 95 and caps 94 are also disposed of, and a new set of packages are inserted into the receptacles, starting the timers over again.

Figure 22:
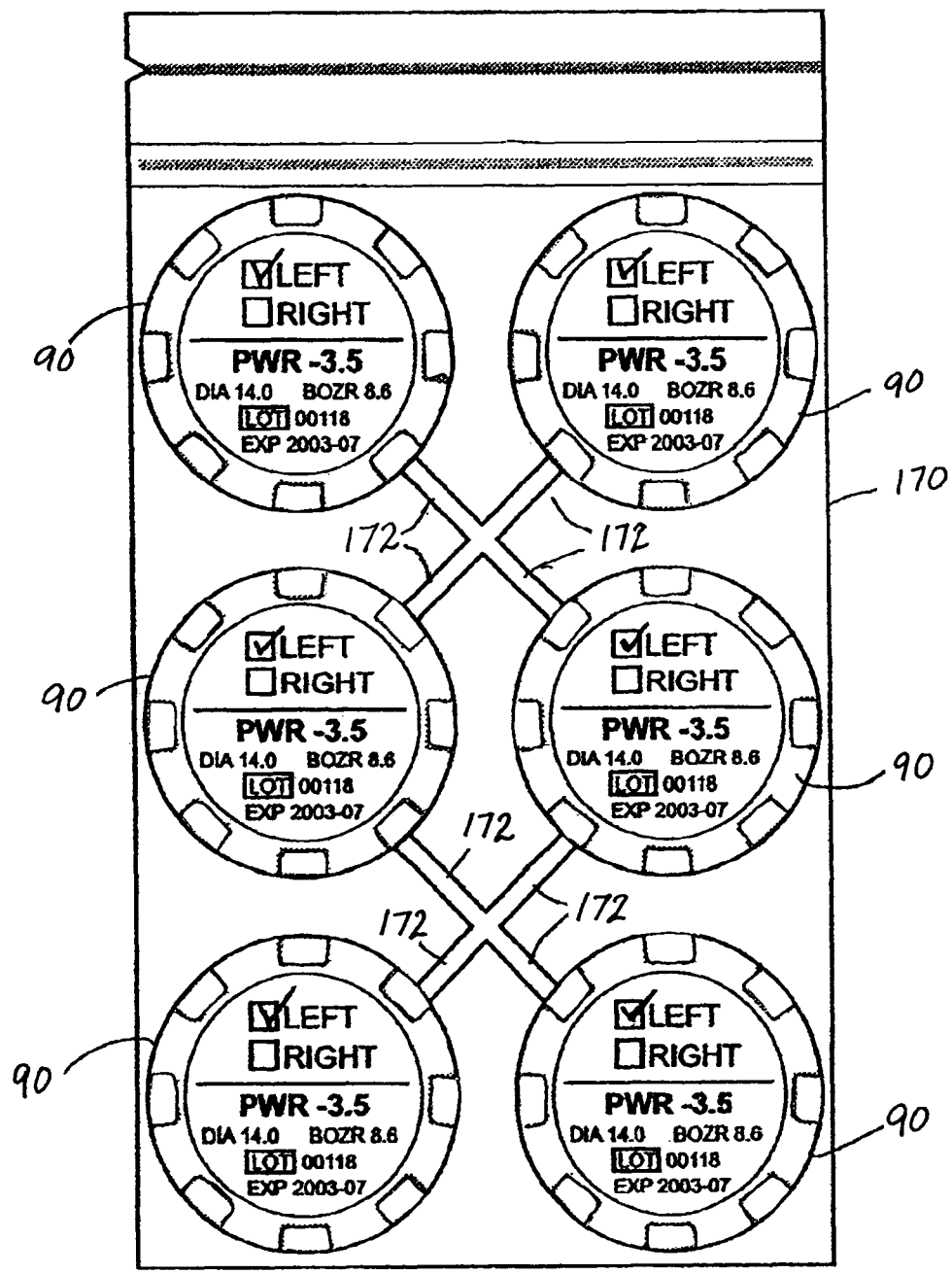
FIG. 22 is a top plan view of a series of lens packages presented as a joined unit for ease of handling and loss prevention.

In the embodiment of FIG. 22, the packages 90 are connected together in a spaced apart relationship by rigid elongated members 172. When the bottom members 95 are made from a thermoplastic in an injection molding process, the rigid members 172 may simply be the runner formed in the mold between different cavities each used to mold a bottom member. In this embodiment, the runner is left intact with the bottom members while the bottom members are used to make packages 90. Thereafter, an entire set of packages, held together by the rigid elongated members 172, is placed in a secondary shipping pack 170. This obviates the need for tubes 70. The lens wearer simply breaks the bottom member 95 off from the runner 172 when he opens the package 90 and starts using the lens. The package can then be secured in the receptacle in base 112 just as described above for the embodiment of FIG. 21.

The packages 10, 20, 30, 40, 50, 90 and 100 can be sterilized by autoclave, preferably at a temperature of 120° C. for a period of 20-30 minutes, or may be sterilized by any other industry acceptable means, such as gamma radiation or the use of ethylene oxide.

One embodiment of a contact lens case holder 230 is shown in FIGS. 26-27A. The holder 230 has two top halves 232 and 234 and a base 236 connected by a hinge 238. The base may include a base plate 231 and a gasket such as an O-ring 241. When closed, the holder has a flat profile and provides a fluid and air tight seal. The holder 230 may be opened by activating a slide 233 on the respective top half that releases that top half from the base. Each top half opens to expose a receptacle 240 for holding a contact lens case.

The holder 230 also has a time keeping device for alerting the contact lens user when a specified period has elapsed and it is time to change lenses. The time keeping device is powered by a battery 237 and may comprise an LCD. Preferably the battery will provide power such that the holder may be used for a period of at least one year. The display which alerts the user that a specified period of time has elapsed may be in the form of days of the week, numbers of days, color changes, a symbol, or any other means.

In the embodiment of FIGS. 26-27A, the display which alerts the user that a period of time has elapsed is a color change. The color of the display may be blue, for example, when the contact lens holder is first inserted into the receptacle. In the embodiment shown, a printed circuit board 245 supports an electroluminescent device 243 which provides light that changes color over time. When the specified period has elapsed and it is time to replace the contact lens holder and contact lens, the color may so indicate by changing to red. The color change may be progressive. For example, the ring 246 may start out all blue, and each day another section of the ring can change color.

In another embodiment, for example with 14 day lenses, the display may include numbers, and may start at the number 1 when the contact lens case is first placed into the receptacle. The display may increase with each passing 24 hour period until the number 14, indicating the passage of 14 days. At this point, the user would remove the contact lens cases and discard both the cases and lenses. Alternatively, the display may count down from 14 to 1. The user would then place a new contact lens case and lens into the receptacle. It is possible for the number of days to be longer or shorter, so long as it corresponds to the period of time for which the disposable contact lens is to be worn.

The time keeping device is reset when a new contact lens holder is inserted into the receptacles. The contact lens case includes a mechanical means capable of triggering a reset of the time keeping device. This mechanical means may include a leg-like extension at the bottom of the contact lens holder which flips a switch on the time keeping device.

Although numerous forms of contact lens cases may be used with the contact lens holder 230, one preferred embodiment is the contact lens packages 202 and 204 shown in FIGS. 23-25. The two lens packages 202 and 204 are identical except for the type of lens that they contain and some indices 20, such as letters L or R, on the case, which may be included if the packages are pre-labeled as being unique for a letter or right eye. The preferred contact lens packages 202 includes a bottom member 208 with a contact lens 210 therein, a cap 212, and a foil 216 covering both the bottom member and the cap. The foil 216 provides protection to both the bottom member and the cap and also provides a connecting means between the two. The bottom member and cap, prior to attachment of the foil, are separate. The foil, once adhered to the bottom member and cap, provides a flexible, hinge-like connection between the bottom member and cap. Further, the cap comprises a support 214 and a sealing member 215 which, when joined to the bottom member, provides a fluid tight seal for containing a contact lens and a fluid therein.

The contact lens package described above is ideal for use with the contact lens holder 230. The contact lens package may be inserted into the receptacles 240 of the holder. In use, the bottom member is inserted into the base and the cap of the contact lens package holder is inserted into the lid of the holder. Once the bottom member and cap have been placed in the receptacles, the protective foil may be removed and the contact lens and fluid may be exposed. After removal of the foil, the blister pack may be closed by closing the lid of the contact lens holder. When the lid of the contact lens contacts the base, the cap and gasket of the blister pack engage the bottom member and provide a fluid and air tight seal.

In one embodiment, the contact lens case is opened and the blister pack is snapped into place in both the base and the lid. In another embodiment, the bottom member of the blister pack is inserted into the receptacle in the base of the holder first. The blister pack is then rotated 90 degrees and by doing so, the cap of the blister becomes engaged with the receptacle in the lid of the holder.

In another embodiment, the receptacle plate slides out of the holder base and the blister pack is inserted into the receptacle. The receptacle plate is then pushed back into place in the base.

In addition, it may be possible to treat the base, holder and/or case with an antimicrobial agent, or make the base, holder and/or the case out of plastic that incorporates an antimicrobial agent in a fashion such that it will not leach out.

Another contact lens case holder 260 is shown in FIGS. 28-31 and 35-37. It is designed to be used with another embodiment of a contact lens package 280 shown in FIGS. 32-37. The lens package 280 is very similar to lens package 202, in that it has a bottom member 288 and a separate cap 292. The cap 292 also has a support 294 and a sealing member 295, but these have a different shape than those of the cap 212. A piece of foil 216 (not shown in FIG. 33 for sake of clarity) can cover both the bottom member 288 and sealing member 295, and extend beyond bottom member 288 to provide a pull tab 297. The bottom member 288 includes two extensions 289 spaced 1800 apart from each other, which are used to secure the bottom member into the base of holder 260.

Holder 260 has two top halves 262 and 264. A sliding cover member 265 can slide to either side of the holder 260, covering one top half but allowing the other half to open so that a contact lens package and storage case 280 can be inserted at the beginning of a new period, or so that the contact lens can be removed or replaced as part of the daily wear routine.

Figure 36:
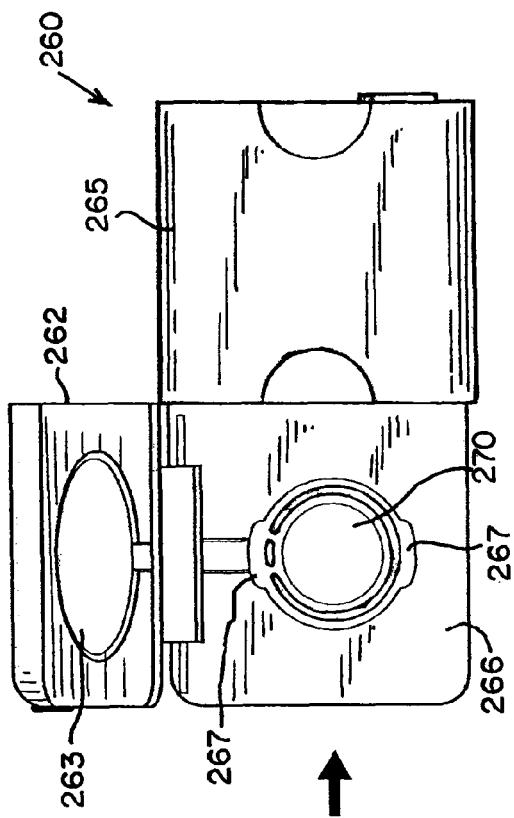
FIG. 36 is a plan view of the contact lens case holder of FIG. 28 with a contact lens package and storage case inserted.
Figure 35:
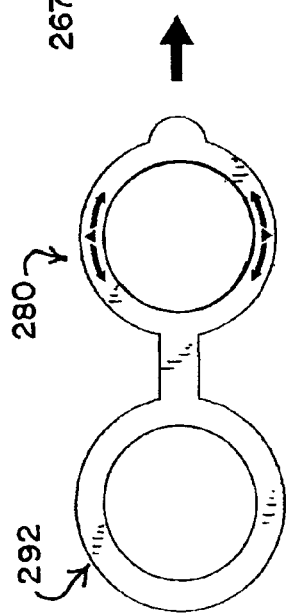
FIG. 35 a plan view illustrating how the contact lens package and storage case of FIG. 32 may be inserted into the contact lens case holder of FIG. 28.
Figure 36:
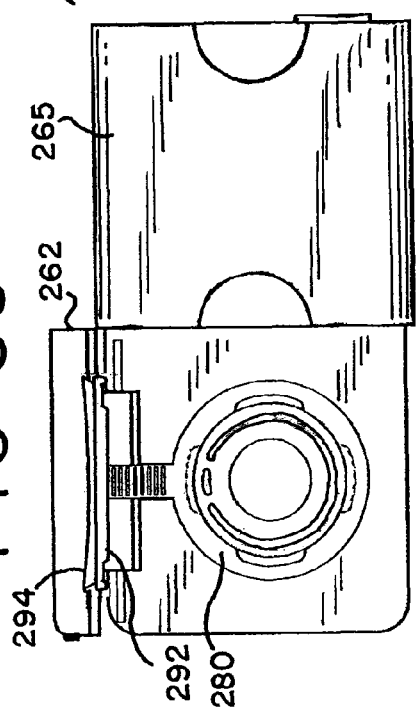

The holder 260 has a base 266 with two receptacles 270. The receptacles 266 are generally round, but have extra slots 267 180° apart into which extension 289 may pass when bottom member 288 is placed into the receptacle. As shown in FIG. 35, the contact lens package 280 is inserted in a position 90° off of its final position. Once extension 289 fit down through slots 267, the package 280 is rotated 90° with respect to the base 266, so that the extensions are captured in the base, as shown in FIG. 36.

The cap 292 may then be fit inside of a cavity 263 formed in the top half 262. In this regard, the support member 294 may also be made of a rubber material so that it can act as a suction cup against the inside of cavity 263. In addition, the cavity 263 preferably includes an undercut around its perimeter, into which an extending marginal portion of support member 294 can fit (see FIG. 37), thus increasing the degree to which cap 292 is secured to top half 262. The contact lens package 280 may include a bridge 298 of the same material used to mold base member 288. The bridge then extends into the area of the cap to help form support member 294. The bridge 298 must be flexible, or be molded with notches as shown in FIGS. 33 and 34, in order to allow it to bend so that the sealing portion 295 of cap 294 may close on base member 288 when the top half 262 closes.

Figure 37:
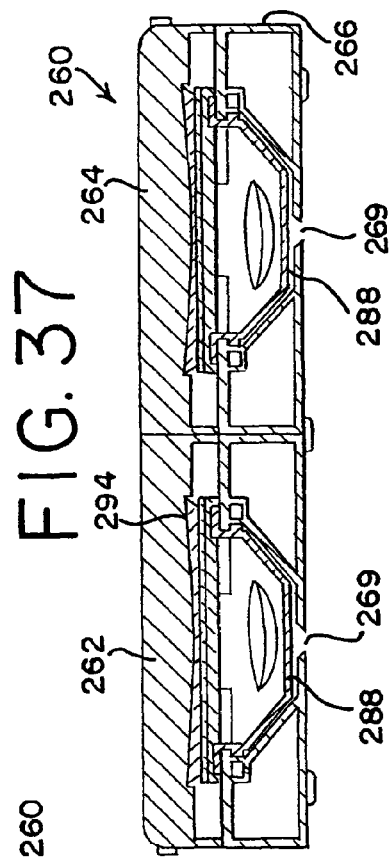
FIG. 37 is a cross-sectional view of the contact lens case holder of FIG. 28 with two contact lens package and storage cases inserted and illustrating the contact lenses therein.

Base 266 may be provided with drain holes 288 in each receptacle, as shown in FIG. 37, so that any water that may splash into the base when the contact lens package 280 is not in place.

Another contact lens case holder 300 is shown in FIGS. 38-45. This holder uses a version of a contact lens package and storage case 330 best seen in FIGS. 42 and 45. In the contact lens package 330, the cap 332 is assembled on top of the bottom member 338 with a temporary seal sandwiched between them. The holder includes two slide out trays, 302 and 304, and has two top halves 306 and 308 hinged to base 310 by a hidden hinge 311. Latches 312 and 314 on the front of the holder 300 may be depressed to release the top halves 306 and 308. Each slide out tray 302 and 304 includes a receptacle 314 that accepts a bottom member 338 of a contact lens package and storage case. The bottom member is placed in the receptacle and rotated to lock it into place, similar to how bottom member 288 locked into receptacle 270. Once it is locked into place, the cap 332 will be aligned such at grooves 334 will slide over projection 316 protruding inwardly in each top half 306 and 308. The projections 316 are aligned in the same direction that the trays 302 and 304 slide. Hence, when the contact lens package and storage case 330 is in its proper orientation in its receptacle, the try may be slid back inside the holder 300. and the cap 332 will be securely fixed in the top half by the projection 316 sliding into grooves 334. The first time that the top half 306 is opened (FIG. 44), it will disconnect the cap 332 from the bottom member 338 and temporary seal. The temporary seal is then removed. exposing the contact lens 339. Thereafter, the top half 306 may be closed (FIG. 45), and the bottom sealing surface of the cap 332 will seal against the exposed top rim of bottom member 338.

FIG. 45 also shows another possible placement of the time keeping indicator. In this embodiment an LED color light 317 is located underneath the bottom member 338, which is translucent. The color of the light shining onto the contact lens may be made to change from blue, to purple, and then to red by using blue and red LED activated so that the blue LED is on. Of course other color schemes may be used. The different colors of light might be chosen so that protein buildup on the lens after it has been worn form its intended usage period is made more readily apparent at the end of the wear cycle.

FIG. 46 shows a cross sectional view of another embodiment of a contact lens case holder 350. This embodiment is similar to the embodiment of FIGS. 26-27A, in that the top halves 352 include a members 354 for holding a support portion of a cap of a contact lens package and storage case and the base 360 includes a receptacle for a bottom member 388 of such a case. The cap 392 also includes a sealing member 394 for sealing the rim of the base member after a temporary sealing film (not shown) has been removed.

The top half 352 includes protrusion 356 that engages a lid switch 363. When the top half 352 is closed, the lid switch is depressed. This switch can thus deactivate any light (not shown) that is used to indicate the duration that the lens case has been in place. In that regard, another switch is placed so as to be activated when the bottom member 388 is placed in the receptacle in the base 360 of the holder 350. Each time a new lens case is placed in the holder, the switch 365 will be activated, resetting the timer device.

In the holder 350, latches 367 on the base 360 and hooks 385 an the contact lens package are used to hold the bottom member 338 of the contact lens package in place.

Figure 47:
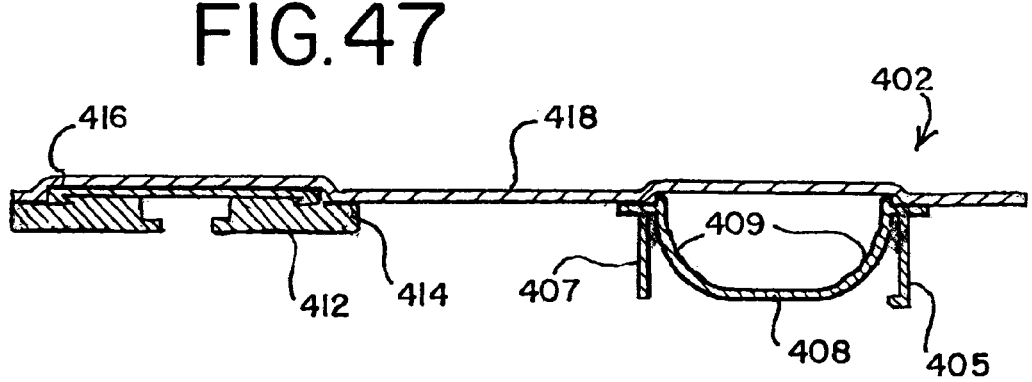
FIG. 47 is a cross-sectional view of an eleventh embodiment of a contact lens package and storage case.

Rather than use an electromechanical switch, an optical circuit inside the base may have a light path that is interrupted when a new contact fens package is inserted. FIG. 47 shows the design of a contact lens package 402 that may be used in such a holder. The bottom members 408 includes is hook 405 on one side, and a simple extension 407 on the other side. This extension 407 can be placed so as to interrupt the optical path when the bottom member 408 may include dimples 409 on its inside surface to prevent a contact lens from sticking to the generally concave surface on the inside of the bottom member.

The contact fens package 402 shows a cap 412 with a support surface 414 and a sealing surface 416 covered by film 418. The support surface 414 is configured with a hole in its center so that it can be compressed when it is inserted into a cavity of the top of a holder. The interface between the sealing surface 416 and the support member has undercuts and over molds as shown to promote adherence between the two parts.

The sealing surface 416 may be a relatively deformable material such as rubber to provide a leak-proof seal with the rim of the base member. One suitable material for the sealing surface 416 in monoprene.

The foregoing description of preferred embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed is:

1. A reusable holder for a fully enclosed contact lens case comprising:
   a base;
   at least one receptacle formed in said base configured to receive a contact lens case; and
   a time keeping device formed in said base;
   wherein the time keeping device comprises an indicator for said at least one receptacle that indicates a period of time that has elapsed since the contact lens case currently in the at least one receptacle was placed therein to denote a need to discard said contact lens case and a contact lens associated with said contact lens case; and
   further comprising at least one fully enclosed contact lens case;
   wherein the fully enclosed contact lens case includes a bottom member having a fluid retaining well with a generally concave shape and a top sealing member, the top sealing member and the bottom member defining a fluid tight lens reception cavity;
   wherein said at least one receptacle configured to receive a contact lens case is a contact lens case reception orifice defined by said base configured to receive said contact lens case in said at least one receptacle; and
   an actuator configured to be triggered to reset said time keeping device when a contact lens case is received in said at least one receptacle.

2. The holder of claim 1 wherein the bottom of the contact lens case is placed in the receptacle and then rotated 90 degrees to snap the bottom of the case into the receptacle.

3. The holder of claim 1 wherein the time keeping device comprises an LCD indicator.

4. The holder of claim 3 wherein the indicator shows the period of time that has elapsed by a display selected from a word, a symbol, a number, day of the week, and a color.

5. The holder of claim 3 wherein the indicator shows the period of time that has elapsed by a number of days.

6. The holder of claim 3 wherein the indicator shows the period of time that has elapsed changing from a first color to a second color, wherein said second color denotes a need to discard said contact lens case and a contact lens associated with said contact lens case.

7. The holder of claim 3 wherein the holder is selected from a plastic and a metal.

8. The holder of claim 3, wherein:
   said actuator comprises a mechanical timer reset switch disposed on said base;
   wherein said mechanical timer reset switch is configured to engage a surface of a contact lens case being inserted into said receptacle and automatically reset the time keeping device when said contact lens case is inserted into the receptacle.

9. The holder of claim 3 further comprising a battery, wherein the battery powers the time keeping device.

* * * * *